US007516438B1

(12) United States Patent
Leonard et al.

(10) Patent No.: US 7,516,438 B1
(45) Date of Patent: Apr. 7, 2009

(54) METHODS AND APPARATUS FOR TRACKING PROBLEMS USING A PROBLEM TRACKING SYSTEM

(75) Inventors: Kenneth F. Leonard, Tewksbury, MA (US); Andre A. Fontaine, Lunenburg, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 1471 days.

(21) Appl. No.: 09/951,039

(22) Filed: Sep. 12, 2001

(51) Int. Cl.
G06F 9/44 (2006.01)
G06F 11/00 (2006.01)
G06F 15/18 (2006.01)

(52) U.S. Cl. .................. 717/102; 717/101; 717/105; 717/124; 714/38; 706/13

(58) Field of Classification Search ............. 717/122, 717/128
See application file for complete search history.

(56) References Cited

U.S. PATENT DOCUMENTS 6,560,721 B1 * 5/2003 Boardman et al. ............ 714/33
6,785,848 B1 * 8/2004 Glerum et al. ................ 714/38
6,944,849 B1 * 9/2005 Glerum et al. .............. 717/127
6,957,366 B1 * 10/2005 McDonald .................... 714/38
2002/0049962 A1 * 4/2002 Kelbaugh et al. ........... 717/128

* cited by examiner

Primary Examiner—Tuan Q Dam
Assistant Examiner—Thuy Dao
(74) Attorney, Agent, or Firm—Brooks Kushman P.C.

(57) ABSTRACT

Mechanisms and techniques provide a system for tracking and reporting on the resolution of problems across multiple product areas. The system can receive a first problem definition and can define a first work item identifying a respective first resolution associated with the first problem definition. The system can further define a second work item identifying a respective second resolution associated with the first problem definition. Work items can be automatically generated by the system or users may manually create the work items. The system can also receive at least one work item update for at least one of the first and second work item. The work item update alters a resolution state associated with either the first and second work items for which the work item update is received. The system can also provide a problem resolution report for the first problem definition based upon a correlation of resolution states associated with at least the first and second work items.

29 Claims, 12 Drawing Sheets

301-1
10039 Edit To WatchList            S3        Common->UI  464-1
D #1  Missing component file in charting package error  306-1

| Type - Where | Product - Stream | Build | Status | Pri | FIX By | VERIFY By | Closed |
|---|---|---|---|---|---|---|---|
| ± CODE - Code | Product 1 - Stream C | 226 | Fixed | P3 | kleonard | arobinson | Closed |

461-1

301-2
10040 Edit To WatchList            S3        Common->Install  464-2
D #1  Change prerequisite check to IE 5.0 SP1  306-2
468   XML parsing won't work on IE 5.0 with no service packs. A minimum of SP1 must be installed.
469

| Type - Where | Product - Stream | Build | Status | Pri | FIX By | VERIFY By | Closed |
|---|---|---|---|---|---|---|---|
| ± CODE - Code | Product 2 - Stream A | 042 | Deferred | P3 |  | kleonard | Closed |
| DOC - Release Notes | Product 2 - Stream A | 040 | Fixed | P3 | DocPerson1 | Editor3 | Closed |
| CODE - Code | Product 1 - Stream B | 001 | Fixed | P1 | afontaine | sstickles | Closed |
| ± CODE - Code | Product 1 - Stream C | 226 | Fixed | P3 | afontaine | jritter | Closed |
| 4/26/01 3:25:44 PM - jritter - Assigned Verify By to jritter. | | | | | | | |
| 5/11/01 3:28:26 PM - jritter - Verified fixed in Stream C | | | | | | | |
| SUST - PatchKit | Product 2 - Stream A |  | NA | P3 | dstpierre | afontaine | Closed |

465
461-2

301-3
10041 Edit To WatchList  466       S3        DB Plug-In->UI-Charts  464-3
D #1  LOADPARAMS Error when clicking on "NEXT" button on charts  306-3

| Type - Where | Product - Stream | Build | Status | Pri | FIX By | VERIFY By | Closed |
|---|---|---|---|---|---|---|---|
| ± CODE - Code | Product X - Stream Y | 226 | Open | P1 | kleonard | jritter | Not Closed |

METHODS AND APPARATUS FOR TRACKING PROBLEMS USING A PROBLEM TRACKING SYSTEM

FIELD OF THE INVENTION

The present invention generally relates to problem tracking systems, and more particularly, to software and computer related mechanisms and techniques which track the resolution of multiple problems across multiple products.

BACKGROUND OF THE INVENTION

Products such as computer systems, electronics, software applications, mechanical systems, electromechanical systems and the like are all susceptible to various types of problems or defects sometimes known as "bugs". Typically, defects or problems arise or occur within a product during the development of the product. As an example, during development of a complex software application, a software developer may develop software code, which appears to the developer to be correctly written, and which appears, when tested, to operate correctly during the runtime operation of the which appears, when tested, to operate correctly during the runtime operation of the software application. However, since a typical complex software application can be operated in many, and sometimes hundreds or thousands of different ways, it may be difficult for a developer to fully test or exercise all possible operations that the software application can perform. Accordingly, during development and test of a software product, the developer may be under the impression that the software application operates properly in all circumstances, when in reality, the software application contains problems, defects or bugs which do not become apparent during testing due to limitations of the testing process. When the testing process of a product is complete and the product is shipped to manufacturing for distribution to a commercial market, the product may include the problems or defects which were not discovered during testing.

Quite often, a company that produces products such as software or computer related systems provides support facilities to assist users (e.g., consumers) who have purchased products made by that company. The support facilities may be staffed with technical support personnel that can be contacted, for example by telephone or e-mail, to allow users to report problems or defects which they encounter during operation of a product which they have purchased. A user can communicate with the technical support personnel to indicate the nature of a problem they are experiencing within the particular product purchased from the company. The technical support personnel may be equipped with a computer system that operates a bug tracking software application which allows the technical support personnel to enter a bug report that conveys the nature of the suspected defect or problem concerning the product. The bug report is entered into a bug tracking database. Thereafter, the bug tracking software application can track the resolution of the suspected defect or problem with respect to the particular product for which the problem was reported using the bug report. If a similar bug or defect is reported in another product, such as a future release of the same product, the technical support personnel can enter another bug report that tracks the resolution of that defect in the other product.

In other situations, during development and testing of a product such as a software application, quality assurance personnel within a company that is producing the product can use a bug tracking software application during testing in order to track the resolution of problems encountered during product testing. As an example, if the quality assurance personnel are testing a new software application product and encounter a bug within the product, the quality assurance personnel can enter a bug report into the bug tracking software for that defect. The bug report identifies the particular problem associated with the particular product for which the bug was reported and may include a description of the specific bug. By using the bug tracking software, the quality assurance personnel can be sure that all bugs associated with the particular software product are resolved and fixed prior to shipment of the product.

After the product is shipped, development personnel within the company may begin work on another version of the software product such as a new release of the product containing additional features. During testing of the new release of the product, development and quality assurance personnel can use the bug tracking software to enter other bug reports for problems or defects discovered within the new release of the product.

SUMMARY OF THE INVENTION

Conventional problem or bug tracking software applications suffer from a number of deficiencies. In particular, conventional problem tracking software applications allow entry of a problem, defect or bug report in association with a single product. It may be the case however, that the defect, problem or bug may exist within multiple products produced by the organization (e.g., the company). By way of example, consider the scenario discussed above in which multiple releases of the same product may be produced by a company. In such situations, a conventional problem tracking software application allows the developer or quality assurance person to create a problem or bug report for a problem discovered in a first version or release of the software product. If it turns out that the problem or defect also exists within the second version or release of the same software product, it is up to the discretion of the development or quality assurance personnel (which may be the same person that entered the first problem or defect report for the first version of the product) to create a duplicate or second problem report for same problem that exists within another product area, such as within the second version or release of the software application. In other words, conventional problem tracking software applications lack the ability to formally associate a single problem or defect to multiple versions or releases of the same product.

Since conventional problem tracking software applications require entry of a separate problem report for each instance of the same problem across multiple products or multiple releases of the same product, the collective number of problem or bug reports that exist within a problem tracking database maintained by the problem tracking software becomes unnecessarily large. As an example, if twenty five problems are reported to exist within a first release of a software product, a quality assurance or development person using conventional problem tracking software creates twenty five problem reports. If a second release of the software product is under development, or has already been shipped, it is likely that that second release contains the same or similar problems as defined in the first twenty five bug reports. Accordingly, using conventional problem tracking software, it is then up to the knowledge of the person who entered each problem report to first realize that a second release or version of the software product even exists (e.g., they must know that the new release is under development or possibly has already been shipped as another product). Once the person has made this first realization, it is then up to this person to then duplicate each problem report for the first twenty five problems in order to create a second set of problem reports to track the same problems within the second release of the product. Using conventional systems, this is largely a manual effort requiring cumbersome cut and paste operations of bug report data that is quite prone to human error. In addition, if the quality assurance or development person was unaware of the existence of the second related product area (e.g., the second release) in the first place (e.g., they may be a new employee unfamiliar with the company product line or development cycle), then no second problem report will ever get generated for the problem which may also (and probably most likely does) exist within the second release of the product. This results in the problem being resolved in the first release while possibly remaining unresolved in the second and future releases of the product.

Moreover, as a result of the manual efforts required to duplicate problem reports to track problems in other product areas, the conventional problem tracking database now indicates that there are many more problems than actually exist and that require completely separate resolutions. Using the former example, the problem tracking software might report that there are fifty outstanding problems or defects across the two releases of the same product, when in reality there are actually only twenty five problems that must be resolved from scratch since the resolution of a problem in the first release is quite often highly related to the resolution the problem within a second release of the same product. In other words, since conventional problem tracking software applications use duplication of problem reports in order to track the same problem across different product areas (i.e., different releases of the same product with different products that may also contain the problem), status reports generated by conventional problem tracking applications provide an incorrect summarization and are unable to accurately summarize how much work is actually required to complete the resolution of all problems associated with an entire set of products.

In addition, since conventional problem tracking applications use different problem reports to track the resolution of the same or a similar problem in different products, a developer who attempts to correct a problem report for one product may be unaware that the same or a similar problem may have already been solved for a similar product, such as a former release of the same product which also had the problem that was resolved, tracked and reported using another problem report. Stated differently, since distinct problem reports must be manually created and do not contain a formalized mechanism to cross reference one another or to different products, developers may spend time "reinventing the wheel" in trying to create resolutions to problems that may have already been resolved by other developers and may have been reported in other problem reports.

In the alternative, if a developer or quality assurance person using a conventional problem tracking software application desires to associate a single defect or problem report with multiple products, a workaround to the aforementioned deficiencies is that the person might be able to mention the existence of the same defect in a different product within, for example, a textual description in the original problem report which a person creating the report uses to explain or describe the original problem or defect. In other words, conventional problem tracking software applications lack the ability to provide a formalized cross-reference of a problem report to a secondary product area or another problem report which also contains the same (or a similar) defect or problem in a manner that allows for tracking the resolution of the problem or defect within both the first and second product areas. Instead, if the person creating the report is aware of another product that might be related to the product for which the report is being created, this person might mention this in the textual description of the problem in the first problem report. However, it is then completely up to a person who is resolving a problem based on a description in the first problem report to recognize, from reading the textual description of that problem, that the problem may also exist within another product or release and that the problem might also need to be resolved in this other product area.

To add to this disorganized approach, the person who attempts the resolution of the problem in both product areas using the single problem report must use the single problem resolution description area within the single problem report to provide a status or other indication of the solution to the problem in two different product areas. Since conventional problem tracking software applications do not provide a convenient mechanism to handle this, this results in the creation of a disorganized resolution description area since it is up to the person resolving the problem to describe both solutions in one area designed to contain the description of only one solution to one problem in one product. Due to these inefficiencies, as noted above, a person reporting a single problem that might be present in many product areas using a conventional problem tracking system typically creates separate problem reports to track resolution of the problem in different products in order to avoid having a single disorganized and large problem report. Also as noted above, this results in inaccurate problem reporting and an inability to inter-relate problem reports which causes an over expenditure of time in resolving problems for which a solution may have already been obtained.

The present invention significantly overcomes these and other deficiencies associated with conventional problem tracking and reporting systems. In particular, embodiments of the invention provide a problem tracking and reporting system capable of tracking the resolution of multiple problems across multiple product areas. The system can receive a single problem definition and can associate the problem definition to multiple work items that represent resolutions to the problem associated with the single problem definition in different product areas. As an example, a user of the problem tracking system of embodiments of this invention can enter a problem definition that reflects a description of a bug in a software product. The software product may have multiple versions, some of which have been released for commercial use, and others that are in various phases of development and/or test. In relation to this problem definition, the user can define work items that represent the appearance or occurrence of the problem in a specific product area and that represent the requirement for a resolution of the problem defined by the problem definition in one of the specific product areas. Each work item thus represents a distinct occurrence of the problem in a specific product area and is used to track the resolution data or state of that work item. The resolution state of a particular work items can identify, for example, the current status of the work item as well as the identity of users associated with resolving that work item in that product area. The system also provides for robust query and reporting techniques and mechanisms that allow a user to obtain accurate problem resolution reports that convey what work items are outstanding for what problems and the status of resolution of those work items. These features are provided in a controlled environment that enforces access control between different users and limits the ability to update work items based on, for example, user identities and resolution state associated with the work items and problem definitions to which they relate.

Embodiments of the invention thus allow tracking of problems (e.g., issues, change orders, defects, bugs, or the like) across parallel development of multiple releases or patches for a product or products. The embodiments allow a development and/or testing team to divide a single problem into several work items that may be tracked independently of each other. Thus, different people can be assigned to work on different work items and different work items can be created for different disciplines, such as work items to track product fixes, work items to track patch creations for different products, work items to track documentation fixes for those products, and so forth.

It is to be understood that a problem tracking system of embodiments of the invention as explained herein is not limited to tracking only problems or defects in the true sense of their meaning, but rather, embodiments of the invention can be used to track the status of any type of activity, such as changes or enhancements required to a product such as engineering change orders for current or subsequent releases of a product line, and so forth. Accordingly, the term "problem" as used herein is intended to include such things as problems, bugs, and defects as well as issues, changes, change requests, enhancements or other activities that are required to be identified and tracked in an orderly manner within a set of products.

In particular, embodiments of the invention provide method embodiments which include a method for tracking resolution of a problem in a problem tracking system. One such method embodiment comprises the steps of receiving a first problem definition and defining a first work item identifying a respective first resolution associated with the first problem definition. The first work item may associate the problem to a specific product area, for example. The method also allows for the definition of a second work item identifying a respective second resolution associated with the first problem definition. The second work item may, for example, associated the problem defined by the first problem definition to another product area, such as another release of the same product area to which the first work item relates, or to documentation for the product, or to an entirely different product. The method receives at least one work item update for one or both of the first and second work items. The work item update allows a user of the system to update the resolution status or state of the work item to track progress in solving the problem with respect to the product area thus altering a resolution state associated with the either the first or the second work item for which the work item update is received. The method embodiment also can provide a problem resolution report for the first problem definition based upon a correlation of resolution states associated with at least the first and second work items. In this manner, a single problem can have multiple resolutions in different product areas, each tracked with a separate work item.

Other embodiments are able to automatically discover product references to which the first problem definition relates and can automatically define work items to track resolutions of the first problem definition within respect to the automatically discovered product references. In this manner, such embodiments of the invention do not require a user to manually create work items for the occurrence of a problem within every product area.

In one embodiment, a first work item can reference a first product reference and the second work item can reference a second product reference, and the first and second product reference can be different disciplines. As an example, the first product can be a developed product and the second product reference can documentation for the developed product. Other example can include such that as manufacturing references, packaging references, marketing materials, and so forth. As such, a single problem definition can have associated work items for all areas (e.g., products, departments, literature, manufacturing processes, machinery, etc.) within an organization (e.g., a company) that might require modification or change based on the problem definition.

Other embodiments of the invention include a problem tracking computer system, such as a computerized device, workstation, handheld or laptop computer, or other device configured with software and/or circuitry to process all of the method operations disclosed herein as embodiments of the invention. In such embodiments, the computer system includes a display, an input output interface (e.g., for receiving user input), a communications interface (e.g., a network interface), a memory (e.g., any type of computer readable medium), a processor and an interconnection mechanism connecting the display, the interface(s), the processor and the memory. In such embodiments, the memory system is encoded with a problem tracking application that when performed on the processor, produces a problem tracking process that causes the computer system to perform any and/or all of the method embodiments, steps and operations explained herein as embodiments of the invention. In other words, a computer that is programmed to operate as explained herein is considered an embodiment of the invention.

Other arrangements of embodiments of the invention that are disclosed herein include software programs to perform the method embodiment steps and operations summarized above and disclosed in detail herein. As an example, a problem tracking software application configured to operate as explained herein is considered an embodiment of the invention. More particularly, a computer program product is disclosed which has a computer-readable medium including computer program logic encoded thereon that, when executed on at least one processor with a computing system, causes the processor to perform the operations (e.g., the method steps) indicated herein as embodiments of the invention. Such arrangements of the invention are typically provided as software, code and/or other data (e.g., data structures) arranged or encoded on a computer readable medium such as an optical medium (e.g., CD-ROM), floppy or hard disk or other a medium such as firmware or microcode in one or more read only memory (ROM) or random access memory (RAM) or Programmable ROM chips or as an Application Specific Integrated Circuit (ASIC). The software or firmware or other such configurations can be installed onto a computer system to cause the computer system to perform the techniques explained herein as embodiments of the invention.

It is to be understood that the system of the invention can be embodied strictly as a software program, as software and hardware, or as hardware alone. Example embodiments of the invention may be implemented within computer systems, computer program products and software applications manufactured by Sun Microsystems of Palo Alto, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

FIG. 9 illustrates an example of a graphical user interface provided according to one embodiment of the invention to allow a user to provide product resolution query information in order to query a problem tracking database for problem definition and work item information.

FIGS. 11 and 12 show examples of problem resolution and resolution severity reports produced by a problem tracking process configured according to embodiments of the invention.

DETAILED DESCRIPTION

Figure 1:
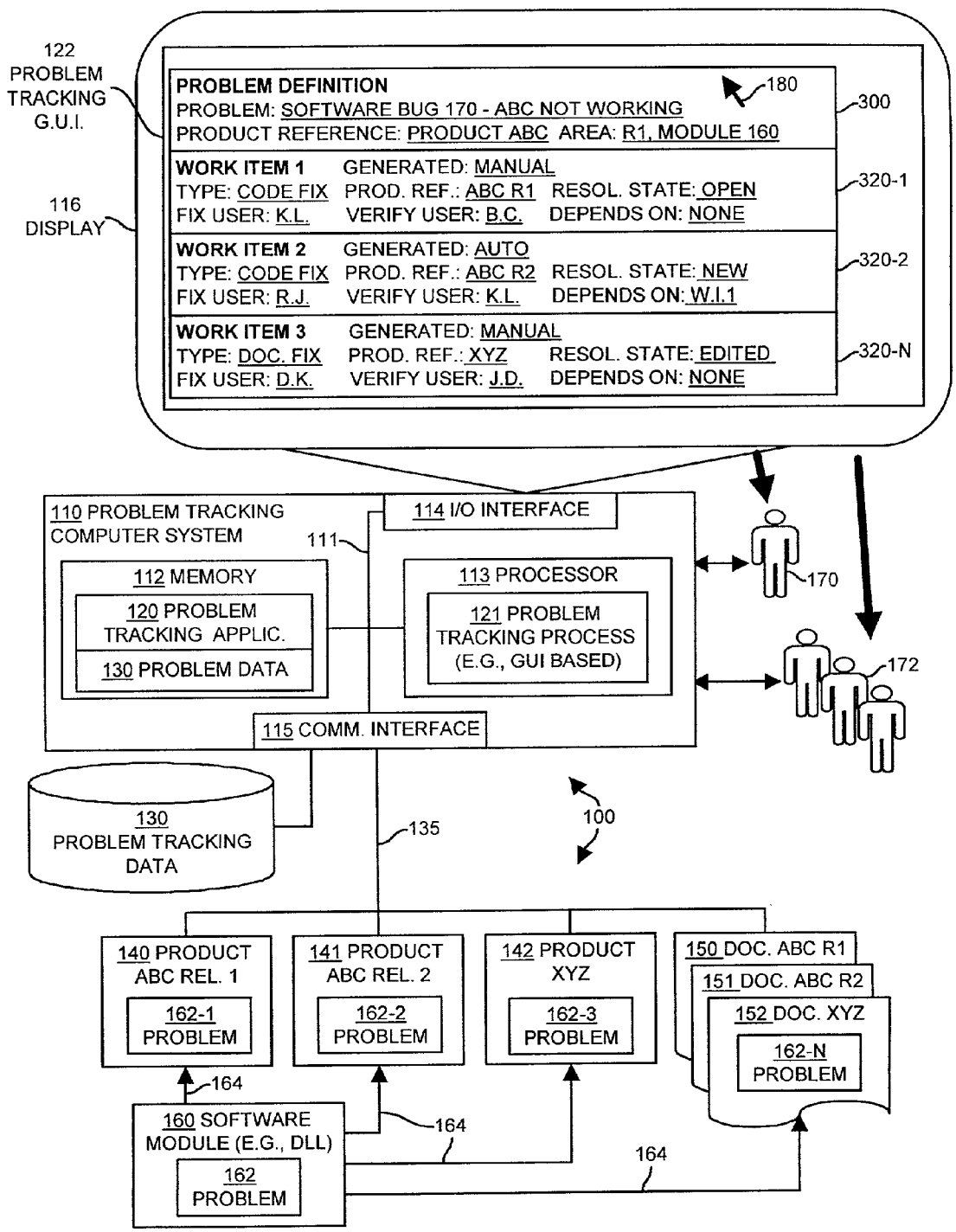
FIG. 1 illustrates an example computing system environment including a problem tracking application and process providing a problem tracking graphical user interface configured in accordance with an example embodiment of the invention.

Embodiments of the invention generally provide a problem tracking and reporting system capable of tracking the resolution of multiple problems across multiple product areas. The system can receive a problem definition and can associate the problem definition to multiple work items that represent resolutions to the problem definition in different product areas. As an example, a user of the problem tracking system of embodiments of this invention can enter a problem definition that reflects a description of a bug in a software product. The software product may have multiple versions, some of which have been released for commercial use, and others which are in various phases of development and/or test. In relation to this problem definition, the user can define work items that represent the appearance or occurrence of the problem in a specific product area. The system uses each work item to track the resolution status or state of that work item for that product area. The resolution state of a particular work item can identify, for example, the current status of the work item (e.g., new, resolution in progress, resolution completed, under test, closed, etc.) as well as the identity of users associated with resolving that work item in that product area and can further provide a description of the resolution.

By way of example, one work item may be defined to represent the occurrence of the problem or patch required in the first release of the product. The user of an embodiment of the invention may then define a second work item which represents the appearance or occurrence of the problem in another release or version of the same product or in a different product requiring another patch. In addition, the work items can be defined to represent the resolution of the problem in a totally different product area such as work items that required the revising of documentation associated with a product to reflect the correct operation of the product in the product documentation in relation to the resolution of the problem within the software product as identified by one or more other work items. That is, with respect to a single problem definition, work items can be defined that represent resolutions of the problem within particular product areas and can specify actions that must be taken to completely resolve the problem, such as editing or rewriting of documentation or user manuals, fixing source code, implementing a change order, verifying that a product still works properly, and other tasks that may be associated with or required to fully resolve the problem associated with the problem definition. Each work item thus represent a task or issue associated with a complete resolution of the problem defined by the problem definition across all product references and areas (e.g., different releases, different products, different disciplines, etc.).

In addition, certain embodiments of the invention provide a problem tracking system that can automatically discover, create, generate or define work items based on other existing work item definitions or based on criteria defined in a problem definition. As an example, consider the situation described above in which a user defines a first work item that represents a bug in a particular routine or software module within a specific software application product. Certain embodiments of the invention are able to automatically discover other product areas such as other software products that may be affected by the existence of the first work item that identifies a first software module having a bug. This may be done, for example, by traversing or searching source code references to the product area reference identified by the first work item.

As a specific example, if the first work item identifies a particular area of software, such as a class in an object-oriented software development environment or a routine or other software module that requires modification in order to resolve the problem defined by the problem definition to which that work item relates, one embodiment of the invention is able to identify other product areas such as other classes or routines used in the same or in different software products (e.g., other releases or version or completely different products) which inherit the class or reference the routine identified by the first work item. Since these other product areas (e.g., other releases of the same product or different products altogether) inherit the class containing the defect identified by the problem for which the first work item represents the resolution requirement, this example embodiment of the invention can automatically generate work items that reflect the requirement for resolution of the same problem within these other classes, routines or areas of the software product. In this manner, such embodiments of the invention avoid a requirement for a user to manually create work item entries that reflect the requirement that this problem be resolved in other product areas. This saves significant time on behalf of the user and helps to ensure that a problem is accurately resolved in all product areas in which that problem may exist. In addition, it avoids the requirement that a user have full knowledge of a product line in order to recognize that a defect might exist elsewhere in other product areas.

In addition to the aforementioned capabilities, embodiments of the invention provide the ability to generate accurate problem resolution reports that can provide a detailed and accurate analysis of the current resolution state of work items with respect to problem definitions being tracked by the system. The problem resolution reports created by embodiment of the invention avoids unnecessary reporting of duplication of problems in multiple product areas since the problem definition is defined once and work items associated with the problem definition are then defined which reflect the resolution state of the problem in different product areas. These and other features of embodiments of the invention will now be explained with respect to the discussion provided below of FIGS. 1 through 12. FIG. 1 illustrates a computing system environment 100 configured in accordance with one example embodiment of the invention. The computing system environment 100 includes a problem tracking computer system 110 that may be any type of computerized device or system such as a personal computer, workstation, portable computing device (e.g., laptop, palmtop or handheld computers) or the like. The example problem tracking computer system 110 includes an interconnection mechanism 111 (e.g., a data bus and/or circuitry) which couples a memory 112 (e.g., any computer readable medium such as random access memory (RAM) and/or read only memory (ROM) or even a disk or other storage medium), a processor 113 (e.g., a microprocessor or central processing unit), an input/output interface 114 (e.g., peripheral device port(s) for a mouse, keyboard, display, etc.) and a communications interface 115 (e.g., modem or other network interface). The input/output interface 114 and communications interface 115 allow peripheral devices and networks to be connected to the computer system 110. In this example, a display 116 such as a computer monitor is coupled to the input/output interface 114 and operates as part of the computer system 110. The problem tracking computer system 110 can render or otherwise display text and visual images such as the problem tracking graphical user interface 122 for viewing by users 170, 172 (as shown by the arrows directed from the display 116 to the users). The communications interface 115 allows the computer system 110 to communicate with a problem tracking data database 130 and a computer or other communications network 135.

Within the problem tracking computer system 110, the memory 112 is encoded with a problem tracking application 120 and problem data 130 which is retrieved, as will be explained, from the problem tracking data database 130. The problem tracking application 120 is software code, data, data structures, classes, logic instructions or the like that embody the processing functionality, data and software operation of embodiments of the invention. The processor 113 can access the memory 112 via the interconnection mechanism 111 in order to launch, run, execute, interpret or otherwise perform the logic instructions of the problem tracking application 120 in order to produce the problem tracking process 121. In other words, the problem tracking process 121 represents one or more portions of the problem tracking application 120 (or the entire application 120) performing within or upon the processor 113 in the problem tracking computer system 110.

In this example, the problem tracking process 121 is a graphical user interface (GUI) based (i.e., GUI-driven) software application that operates to produce the problem tracking interface 122 on the display 116 during operation of the problem tracking computer system 110. In this example, the graphical user interface 122 includes an example display of a first problem definition 300 as well as N work items 320-1 through 320-N. Users 170, 172 (whose distinctions will be explained shortly) can operate the problem tracking graphical user interface 122 using input devices such as a keyboard and/or a mouse to maneuver a graphical pointer 180 on the display 116.

A plurality of products 140 through 152 are also illustrated in the example computing system environment 100 shown in FIG. 1. Specifically, products 140 through 152 represent any type of product produced by an organization. Examples of such products 140 through 152 are software application products (e.g., source and/or object code), software incorporated into hardware products (e.g., firmware or an application specific integrated circuit (ASIC)), hardware or computer products, or any other type of software, computer, electrical, mechanical or electromechanical product and/or documentation (e.g., user manuals, design documents, reference materials) related to such products. In this particular example, the products 150 to 152 represent documentation associated with the products 142 through 142.

Assume for this discussion that the products 140 through 142 represent software and/or computer related products, and that specifically, the product "ABC REL. 1" 140 represents a first release of an ABC software product whereas the product "ABC REL. 2" 142 represents the second release of the ABC software product. Product XYZ 142 may be any other software and/or computer hardware product. Also as illustrated in this example, a software module 160 is inherited or otherwise referenced 164 by each of the products 140 to 152. The software module 160 may be, for example, a library, subroutine, procedure, routine, script, class, object, source code or other software related entity which, for example, may be incorporated into the source code of the software products 140 and 142 and which may be referenced by the hardware (e.g., firmware or a hardware definition language) of the product XYZ 142 which is literally referenced (e.g., during development of the hardware and/or software) in order to incorporate the functionality or logic instructions provided by the software module 160. In addition, the documentation products 150 through 152 may also reference the software module 150 to explain its operation as designed.

Of particular importance to this example is that the software module 150 includes a problem 162. The problem 162 represents a problem, defect, bug, change order, request or other issue that exists within the software module 160 causing the software module 160 to perform incorrectly or abnormally. Since the products 140 to 152 each make a respective reference 164 (either directly or indirectly) to the software module 160, the products 142 152 each contain, include or describe (in the case of documentation products 150 to 152) a respective version or copy of the problem 162-1 through 162-N. In other words, the problem 162 exists as a respective problem 162-1 through 162-N within each of the product references or areas 140 to 152 (e.g., in one or more places) since each of these product areas references the software module 160 and hence references the problem 162.

The users 172 represent developers (e.g., software engineers) of the various products 140 to 152 and the software module 160, while the user(s) 170 (of which there may be more than one) represents, for example, a quality assurance person responsible for testing and assuring the quality of the products 140 to 152 and the software module 160. In this example, users such as the developers 172 or customers (not shown) who purchase such products 140 through 152 may encounter or discover the existence of the problems 162-1 through 160-N that each represent the operation of the problem 162 associated with the software module 160 within each respective product 140 through 152. Upon detecting a problem 162-1 through 162-N, a consumer or user 172 can report the problem to the quality assurance user 170 and either the quality assurance user 170 or that user 172 (i.e., the developer who may have detected the problem 162) may utilize the problem tracking system configured according to embodiments of the invention as explained herein in order to track a resolution of the problem within the different products 140 to 152.

Directing attention now specifically to the problem tracking graphical user interface 122, the problem tracking process 121 providing this interface 122 allows a user, such as one of the developers 172 or the QA user 170, to enter a problem definition 300 into the problem tracking graphical user interface 122. Generally, the problem definition 300 identifies the specific problem 162 with respect to a certain product area via a product reference. In this example, the problem definition 300 identifies the product reference or area as the existence of the software bug 162-1 within the ABC product ABC and more specifically, within the area "R1" (standing for release 1) and further within the software module 160.

In addition, the problem tracking process 121 allows the creation of work items 320 to track the resolution of the problem description in one or more product areas. In this example, each work item 320-1 through 320-N represents the requirement for resolution of the problem 162 identified by the problem definition 300 within a respective product areas, such as within each of the respective products 140 through 152. As will be explained shortly, work items 320 maybe be either manually created by users 170, 172 or may be automatically generated by the problem tracking process 121.

Each work item 320 can represent the requirement to solve the problem identified by problem definition 300 within a specific product area and can further contain and track the entire history and resolution status or state of the specific work item 320 in relation to the specific product area to which that work item relates. In this manner, embodiments of the invention provide a one-to-many relationship between a problem definition 300 and multiple work items 320 required to resolve the problem definition in various product areas. In the example illustrated in FIG. 1, the second work item WORK ITEM 2 320-2 provides a reference to the requirement for resolution of the problem identified by the problem definition 300 within the second release of the ABC product 141. In other words, work item 320-2 track the resolution of the problem 162-2. As another example, the work item WORK ITEM 3 320-N represents the requirement for a documentation fix within the XYZ documentation product 152, which is problem 162-N. In other words, the work item 320-N represents the requirement that documentation associated with the XYZ product 142 be rewritten to correctly explain or recite the correct operation of the XYZ product 142 (e.g., how it should work in the absence of problem 162-3) and thus represents resolution of the problem 162-N that explains the incorrect operation. Stated generally, the resolution or history of the problem 162-N is tracked by the work item 320-N.

Also in this example, each work item 320 includes a work item TYPE that generally identifies what type of resolution is required to resolve the problem associated with the problem definition 300 with respect to the product area (PROD. REF.) referenced by the particular work item 320. In this example, some work items require code fixes (i.e., CODE FIX for software bugs) while other work items require documentation fixes (i.e., DOC. FIX). The example work items 320 illustrated in FIG. 1 also identify users who are assigned or are responsible to provide the resolution or correction to the problem in the product area referenced by the work item 320 and who are in control of the resolution state of the work item 320. Generally, the resolution state of a work item indicates a status of the work item and in this example can include NEW for new work items which are created but for which the resolution has not yet been work on, OPEN for work items that are currently being work on, and EDITED or CLOSED which indicates that a work item has been completed.

In addition, the work items 320 in this example include a GENERATED indicator that identifies whether or not this particular work item 320 was manually or automatically generated. Automatic generation of work items will be explained in detail later. Generally however, embodiments of the invention are capable of analyzing one or more existing work items 320 for references to product areas and are then capable of searching product data for other product areas that reference the existing work item product areas to identify new product areas. Based on the fact that one product area makes a reference to a product area identified in an existing work item (e.g., a source code reference such as an include file statement to another software module that is identified as a product area for an existing work item), embodiments of the invention can make the assumption that this newly discovered product area also contains a version of the problem defined by the problem definition 300. As such, new work items can be automatically generated for these new product areas. With respect to the example in FIG. 1, since the products 140 to 142 each contain a reference such as a software inheritance or include reference to the software module 160, if the problem 162-1 is reported with the first release of the ABC product 140, automatic discovery of the problem 162 within other product such as products 141 and 142 can be achieved by embodiments of the invention by detecting references within these other products 141 and 142 to the software module 160 identified in the for work item 320-1 as having a problem defined by the problem definition 300.

While not shown in the example illustrated in FIG. 1, but as will be explained in more detail later, a problem tracking system provided in accordance with an embodiment of the invention further provides the ability for users 170, 172 to provide work item updates to the work items 320 in order to modify the resolution state of the work item 320 as progress is made in resolving the issues associated with that work item 320 with respect to resolution of the problem defined by the problem definition 300. Based on work item updates, embodiments of the invention can modify the resolution state of the work item and can update the history of the work item to reflect a complete record of how that work item progresses in resolving the problem for a specific product reference. The history of a work item, which embodiments of the invention track, thus can indicate when steps were taken to resolve the problem for the product area and can indicate what users were involved in this resolution. Still further, embodiments of the invention provide the ability for users 170, 172 to provide or generate (and display within the problem tracking GUI 122) detailed graphical problem resolution reports that provide selection resolution status or state information for particular work items 320 with respect to particular problem definitions 300 defined within the system.

It is to be understood that embodiments of the invention include the problem tracking application 120 (i.e., the unexecuted or non-performing logic instructions and/or data) encoded within a computer readable medium such as a floppy disk, hard disk or in an optical medium, or in firmware or, as in this example, as executable code within the memory 112 (e.g., within RAM). It is also to be understood that other embodiments of the invention comprise the problem tracking application 120 operating within the processor 113 as the problem tracking process 121 and that other embodiments include the problem tracking computer system 110 operating to provide a problem tracking system such as that explained herein. Those skilled in the art should understand that the problem tracking computer system 110 may also include other processes and/or components, such as an operating system.

Figure 2:
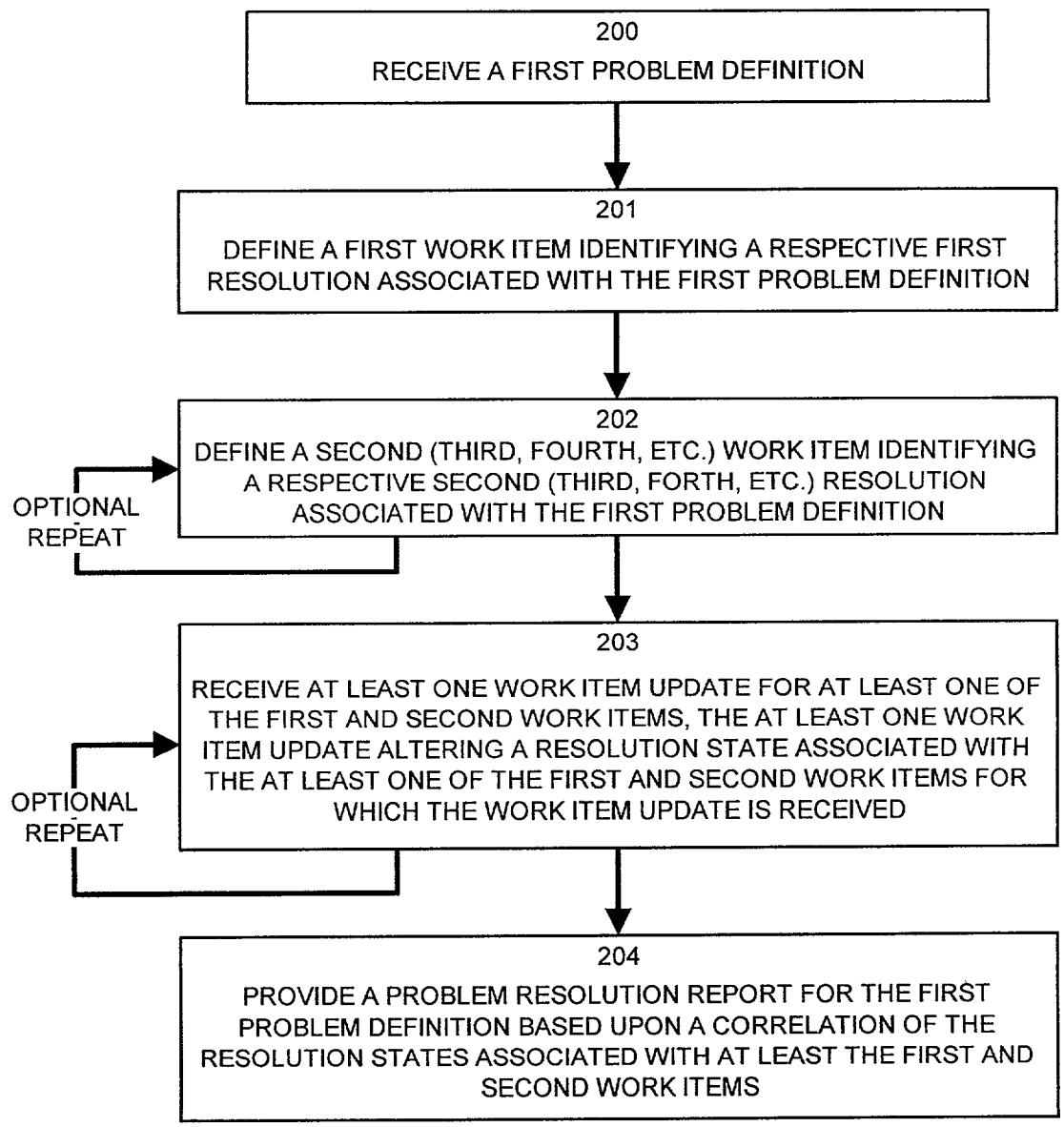
FIG. 2 is a flow chart of processing steps performed by a problem tracking process configured according to one embodiment of the invention.

FIG. 2 illustrates a flow chart of processing steps performed by the problem tracking process 121 operating within the problem tracking computer system 110 configured in accordance with one example embodiment of the invention.

In step 200, the problem tracking process 121 receives a first problem definition 300. As briefly explained above with respect to the example in FIG. 1, the first problem definition 300 identifies and provides a description of a problem, defect, bug or other issue related to a specific product reference such as a bug within the software module 160 which is incorporated into one of the products 140 to 152. It is not required that the problem definition 300 identify the specific product area such as the exact software module 160 that contains the problem, but rather, the problem definition 300 generally identifies the problem itself such as explaining the improper operation or description of some feature of some product 140 through 152. It may be up to the developers 172 to determine which specific product area or areas, such as which specific software module(s) 160, contain or are responsible for causing the problem defined by the problem definition 300. A work item can then be created for each problem area and a work item state can be then updated or set at that time, via a work item update as will be explained later, to reflect the specific software module or other product reference area that contains the specific problem.

Next, in step 201, the problem tracking process 121 defines a first work item (e.g., 320-1) identifying a respective first resolution associated with the first problem definition 300. At this point, the first work item 320-1 recites or relates the existence of the problem (e.g., 162-1) defined by the problem definition 300 within the specific product (e.g., 140) to a specific product area such as within the software module 160.

In step 202, the problem tracking process 121 defines a second work item 320-2 identifying a respective second resolution associated with the first problem definition 300. As explained above, this second work item 320-2 represents the requirement for resolution of the problem definition 300 within another product area such as within the second release of the ABC product 141 that is different than the product area for the first work item 320-1.

The problem tracking process 121 may optionally repeat the processing of step 202 to define third, forth, fifth, Nth and so on for work items 320-3 through 320-N each identifying respective resolutions associated with the first problem definition in different product areas. With respect to the example in FIG. 1, the problem tracking process 121 can define respective work items 320 via iterative processing of step 202 for each of the problems 162-3 through 162-N in each of the products 142 to 152. In this manner, a respective work item 320 is created to track the resolution of all instances of the problem 162 within the software module 150 and it relates to any products which reference or incorporate the software module 160. As will be explained, the processing of step 202 may be performed manually under the direction of a user 170 or 172 or some work items (or possible all) may be generated via an automated discovery operation of embodiments of the invention.

In step 203, the problem tracking process 121 receives at least one work item update for at least one of the first and second work items 320-1, 320-2. The work item update alters a resolution state associated with the respective work item for which the work item update is received. In other words, as briefly explained above, a user such as a developer 172 may been assigned a particular work item 320. This means that the developer 172 is responsible for resolving the problem defined by the problem definition 300 with respect to particular product area identified by that work item 320. As the developer 172 addresses solving the problem or defect associated with the problem 300 for the product area identified by the specific work item 320, the developer 172 can periodically provide work item updates for the work item 320 maintained by the problem tracking process 121. The work item update allows the user to change the resolution state of the work item to indicate progress which is being made towards resolution of the problem. Resolution states can be, for example, incremental changes in resolution states of a work item 320.

As an example, when a work item is first created in steps 201 or 202, the work item may have a default resolution state or status of NEW indicating that no work has been done on the work item 320. Then, a quality assurance user 170 may alter the resolution state of the work item 320 by providing a work item update indicating that the work item 320 is now OPEN to be resolved. In addition, the quality assurance user 170 may assign a particular developer 172 to resolve the problem identified in the product area for the work item 320. Once the developer 172 begins work on the resolution associated with the work item 320, the developer 172 may provide a work item update to alter the resolution state of the work item 320 from OPEN to WIP, standing for "Work-In-Progress". Thereafter, once the developer 172 complete resolution of the problem identified the problem definition 300 with respect to the product area identified by the work item 320, the developer 172 may again provide a work item update via the processing of step 203 in order to alter the resolution state from WIP to COMPLETE indicating the developer has completed resolution of the problem. Thereafter, the resolution state may thus indicate that a quality assurance user 170 must review all work items having a resolution state of COMPLETE in order to assure that those work items properly resolve the problem identified by the problem definition 300 in their respective product areas. Once this verification procedure has begun, the quality assurance user 170 may provide a work item update to the work item 320 to further modify the resolution state from COMPLETE to TESTING to indicate that quality assurance testing is being performed on the product area associated with the work item 320. Finally, when product testing is complete, the quality assurance user 170 can provide yet another work item update to alter the resolution status or state to CLOSED to indicate that this work item 320 has been completely resolved. It is to be understood that the work item status or states mentioned above are provided by way of example only.

Next, in step 204, the user can operate the problem tracking process 121 to provide a problem resolution report for the first problem definition 300. The problem tracking process 121 may create the problem resolution report from a correlation of the resolution states associated with work items associated to the problem definition 300 for which the report is to be provided. If multiple work items exist for a problem definition 300, the problem resolution report may be based upon a correlation of the resolution states associated with either or both of the first and second work items 320. In this manner, this embodiment of the invention can provide a summarization of all work items required to resolve the problem defined by the problem definition 300. This provides an organized way to get an accurate determination of the amount of work required to completely resolve the problem. As will be discussed later, users can provide query criteria to specify what type of product resolution reports is generated.

According to the aforementioned processing steps, embodiments of the invention are capable of tracking the single problem or defect within multiple product areas. As a result, problem resolution reports can accurately depict the amount of work that is required in certain particular product areas in order to resolve a single problem within multiple product areas without the requirement for referencing multiple problem definitions.

Figure 3:
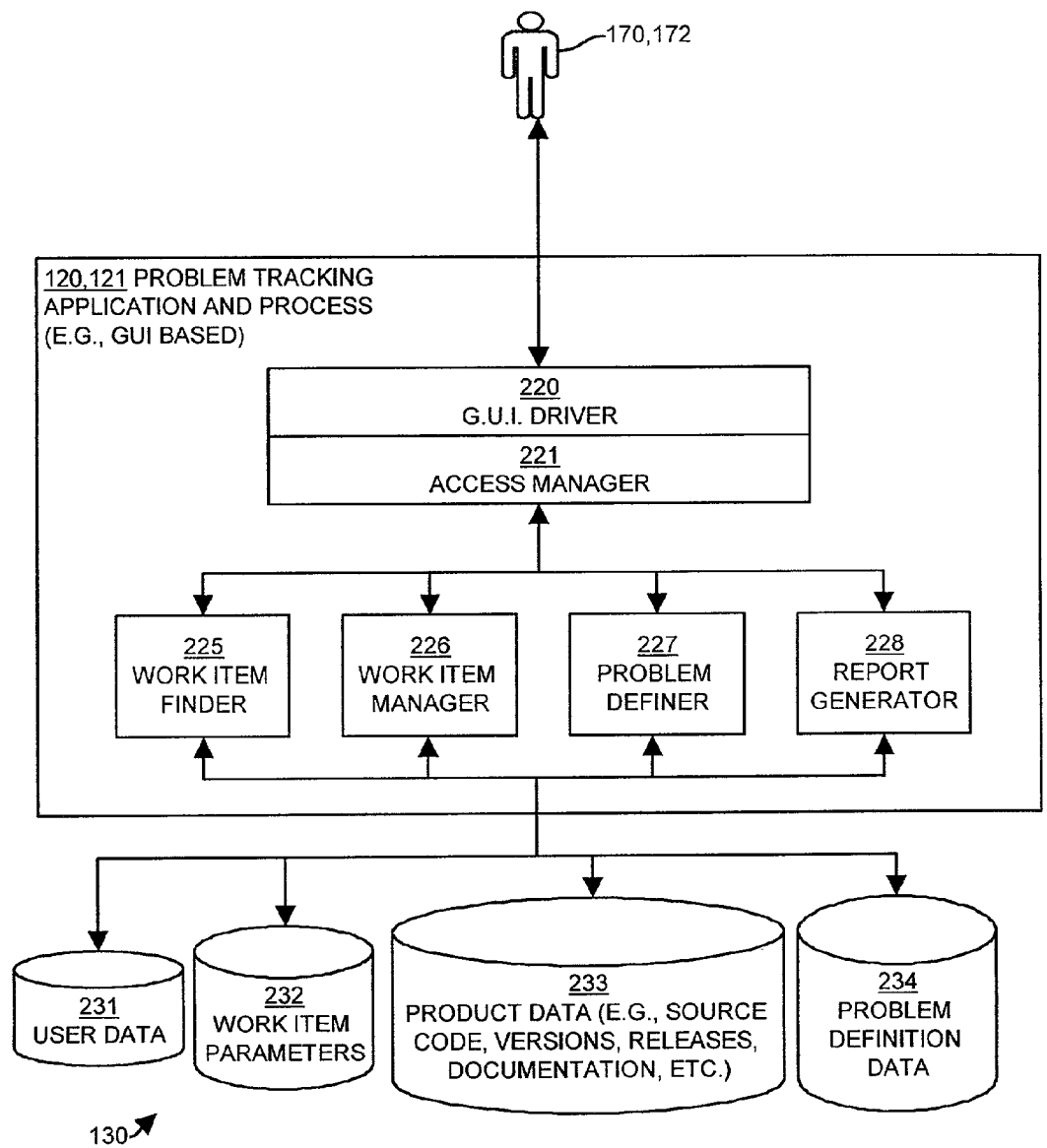
FIG. 3 illustrates a software architecture of a problem tracking application and process configured according to one embodiment of the invention.

FIG. 3 illustrates an example software architecture of a problem tracking application and process 120, 121 configured according to one example embodiment of the invention. With respect to this description of FIG. 3, reference will be made to the architecture within the problem tracking application 120. It is to be understood however that this architecture can operate as one or more executable software tracking processes 121 or as separate routines or processes within the processor 113 illustrated in FIG. 1.

The problem tracking application 120 includes a graphical user interface driver 220, an access manager 221, a work item finder 225, a work item manager 226, a problem definer 227 and a report generator 228. The problem tracking application 120 is able to access various database 231 through 234 that collectively comprise the problem data 130. In this example, the problem tracking application 120 can access user data 231, work item parameters 232, product data 233 such a source code, versions or releases of products, documentation references and so forth, and product definition data 234.

Generally, the graphical user interface driver 220 is responsible for providing the look and feel of the problem tracking graphical user interface 122 which the users 170 and 172 use to operate the problem tracking application and process 120, 121. The access manager 221, the operation of which will be explained in more detail later, provides access control and authentication techniques to authenticate users 170 and 172 with respect to their ability to create, modify and update problem definition and work items and to generate product resolution reports within the problem tracking system of embodiments of this invention.

The work item finder 225 generally embodies the processing associated with automatic discovery of product areas which contain references to product areas defined or referenced by existing work items 320. That is, the work item finder 225 is capable of traversing or searching the product data database 233 in order to discover other product reference or area which may also contain the problem defined by the problem definition 300 due to the fact that the other product areas may reference a product area identified by existing work item 320.

The work item manager 226 provides processing related to the creation and interrelation of specific work items 320. The work item manager 226 can access the work item parameters database 232 in order to obtain a set of work item parameters based upon, for example, the identity of the user 170,172 operating the problem tracking process 121 or based on a current resolution state or status of a work item.

The problem definer 227 provides processing related to the creation of specific problem definitions 300. The problem definer 227 may access any or all of the problem tracking data databases 231 through 234 in order to accomplish the ability to create problem definitions 300. The report generator 228 is capable of producing the problem resolution reports mentioned above with respect to step 204 in FIG. 2.

Figure 4:
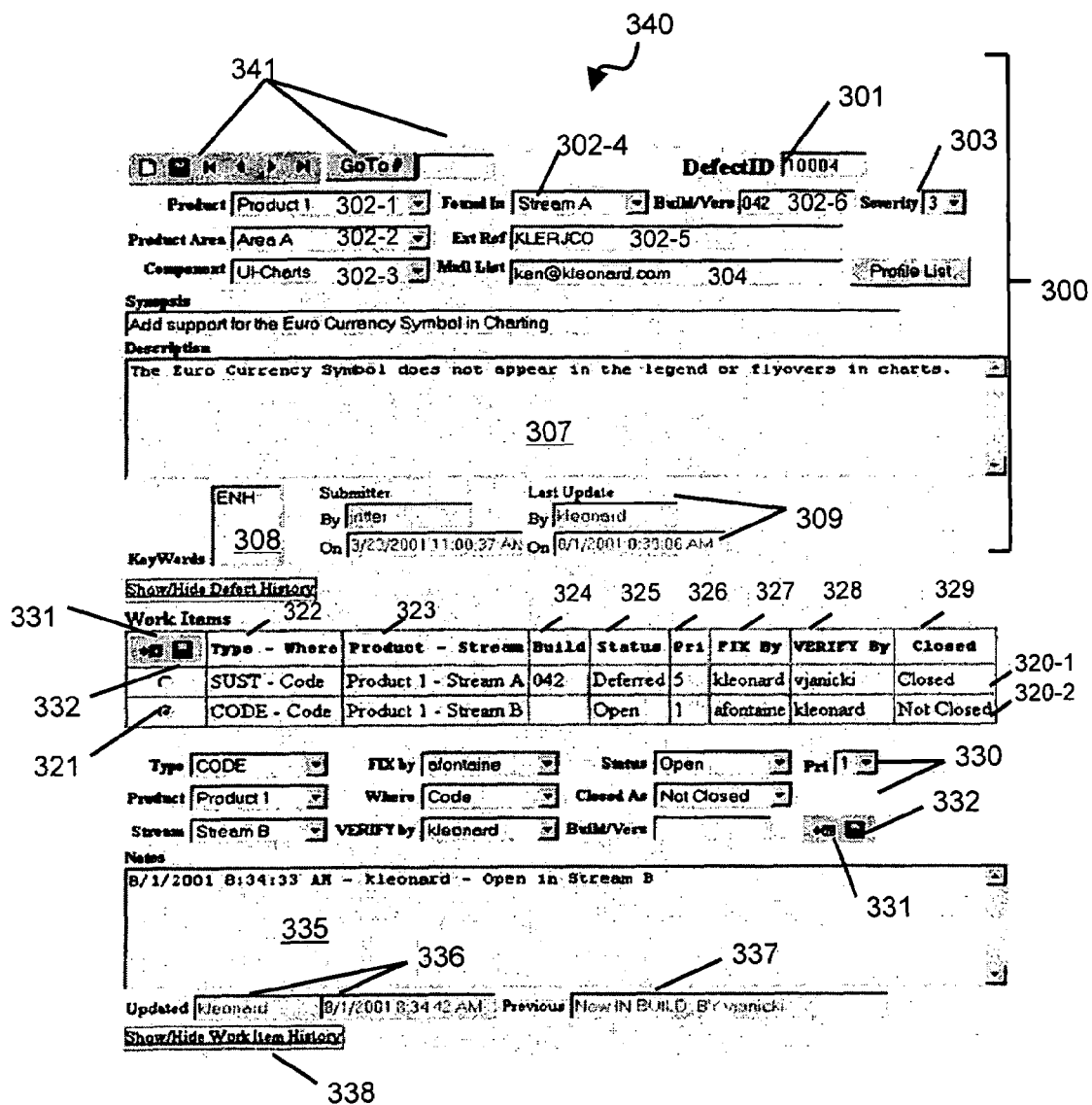
FIG. 4 illustrates an example of a graphical user interface provided according to one embodiment of the invention which allows a user to provide a problem definition and work item definitions for tracking within the problem tracking system.

FIG. 4 illustrates a more detailed example screenshot 340 of the problem tracking graphical user interface 122 that allows the problem tracking process 121 to receive a problem definition 300 and related work items 320. When a user operates the problem tracking process 121 to enter a new problem definition 300, one embodiment of the problem tracking software provides the screenshot interface 340 and automatically assigns a unique defect identifier 301 with which to track all work item resolutions 320 associated with this particular problem definition 300. In addition, the problem tracking process 121 provides a problem definition area 300 that includes many product reference indicator fields 301 through 309 which a user 170 or 172 can review, select and/or complete in order to provide a complete problem definition 300.

In particular, the problem definition area 300 includes user selectable product preference indicator fields such as a product field 302-1, a product area field 302-2, a component field 302-3, a found-in field 302-4, in existing referenced field 302-5 and a build version field 302-6. Each product reference indicator field 302-1 through 302-6 provides the ability for a user to select or otherwise provide a specific reference to a specific product area in as much detail as possible. The product identified in this manner is typically the product in which the problem is first detected and then reported. The problem definition 300 does not serve as a work item for this product, and thus a work item 320 should be created to solve the problem in the product identified in the product description, as well as in any other products areas represented by separate work items. This process of creating such work items 320 as will be explained can be manual or automatic.

The problem definition area 300 further includes a severity field 303 allowing the user to define how severe this particular problem is with respect to the product to which it relates in the problem definition area 300. Problem synopsis and description fields 306 and 307 allow a user to enter a textual synopsis and/or detailed description of the problem. The synopsis 306 is generally a short identification of the problem while the description field 307 provides for a more in-depth description of the particulars of the problem related to the problem definition 300. The keywords field 308 allows a user to enter certain keywords which become associated with its problem definition 300 in order to provide searching and reporting capabilities which will be explained later. The problem tracking process 121 automatically completes the submitter and update fields 309 with the identity of the user(s) that initially submitted the problem definition 300 and the identity of the user who last updated the problem definition 300.

This example interface 340 further includes a work item area 320 that includes two defined work items 320-1 and 320-2. Each work item 320 includes a plurality of resolution state fields including a work item type field 322, a product-stream field 323, a build field 324, a status field 325, a priority field 326, a fixed by field 327, a verify by field 328 and a closed status field 329. The resolution state fields 322 through 329 collectively identify the resolution state or status associated with each work item 320. Upon creation of a problem definition 300, a user 170 or 172 is able to select a new work item operation 331 which creates a new work item 320 and allows the user to enter the specific resolution state information 330 for that work item. In other words, when a user uses an input mechanism such as the mouse pointer 180 (FIG. 1) to select the new work item operation 331 in interface 340, the problem tracking process 121 creates a new row of work item resolution state fields which collectively form the work item 320. In addition, the user is able to manipulate the resolution state information 330 which is a collection of menus corresponding to each respective resolution state field 322 through 329 in order to select a particular resolution state associated with this new work item. Once the user has made his or her chosen selections for each of the selectable fields within the resolution state information area 330, the user can depress the save work item operation 332 in order to save the resolution state information 330 as a new work item 320-N. In this manner, the resolution state information 330 for a new work item 320 allows a user to choose different product areas 323, 324 to which the problem definition 300 should be related.

In addition, the interface 340 includes a work item notes field 335 which allows each work item 320 to contain associated resolution notes provided by the users which indicates additional information related to the current status of the resolution of the problem associated with particular work item 320. During the lifecycle of a particular work item 320, users are able to add textual descriptions into the work item notes field 335 for particular work items 320 in order to clarify issues related to that work item.

The updated field 336 indicates a time and date and user which last updated information related to a particular work item 320. The previous field 337 can be used to reference which particular other work item or work items 320 may be related to this particular work item. Some embodiments of the invention are capable of automatically generating work items 320 based on product and other information from a previously defined or related work item 320. The previous field 337 can be used to indicate the status of the work item 320 before its last change. For example, if the status is "Fixed" now, the previous field 337 might indicate that "Open" was the previous status since that work item was open before it was fixed. The history (to be explained shortly) of a work item can show how a work item transitions through various states of resolution.

The work item selector field 321 can be selectively chosen by a user in order to view resolution state information 300 related to a particular work item 320. In this example, a user has selected the work item selector field 321 corresponding to work item 320-2. As such, the problem tracking process 121 populates the values of the resolution state information fields 330 with each of the respective values of the resolution state fields 322 through 329 from the work item 320-2. In this manner, a user can use the work item selector field 321 to choose a particular work item 320 in order to provide a work item update by modifying the current values of one or more of the menu values within the resolution state information fields 330. Once the work item update is provided in this manner, the user may activate a work item save operation 332 in order to save the current work item update to update the resolution state fields 322 through 329 of that particular work item 320. The user is further able to select the show/hide work item history option 338 in order to show or hide particular details of the history for the particular selected work item 320.

The history for a work item shows the changes made to that work item which have taken place to a work item, such as when work item status or state changes from one state to another, which user identity changed this status or state, and so forth. Embodiments of the invention automatically keep the history for each work item 320 from its inception. The notes field 335 provides a means for a user to add textual description to a work item.

An example operation of the use of the interface 340 illustrated in FIG. 4 will now be provided with respect to an example entry of the problem definition and work items in conjunction with the processing steps shown in the flow charts in FIGS. 5 through 8.

Figure 5:
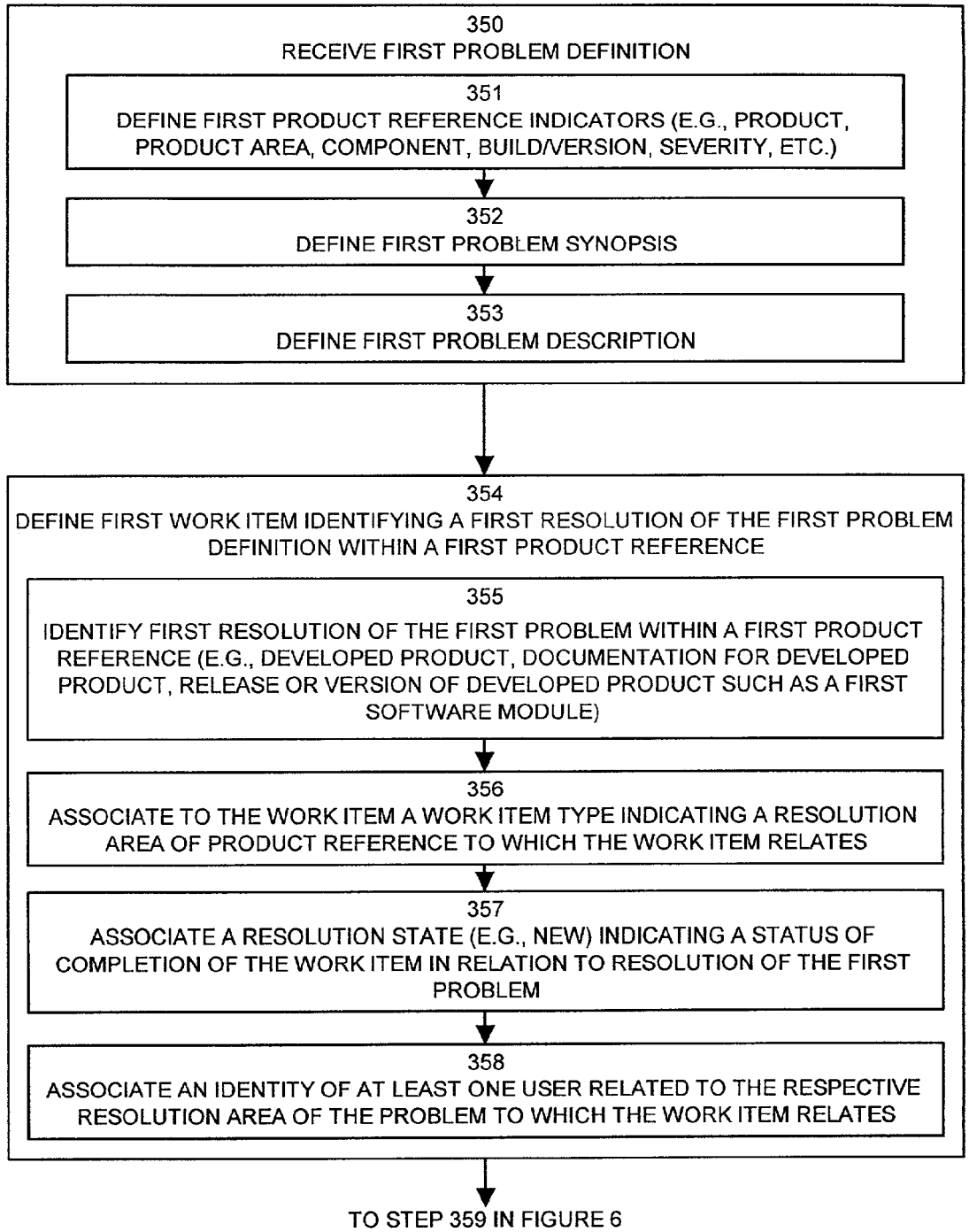
FIGS. 5 through 7 are a flow chart of processing steps which allow a user to operate a problem tracking process configured according to one embodiment of the invention to define a problem definition and work items related to the problem definition.

FIG. 5 illustrates a flow chart of processing steps performed by a problem tracking process 121 under control of a user operating the interface 340 as illustrated in FIG. 4 in order to provide a problem definition 301 and/or work items 320.

In step 350, a user 170, 172 operates the problem tracking process 121 to receive a first problem definition 300. In this example embodiment, this processing is accomplished in steps 351 through 353.

In step 351, the user operates the problem tracking process 121 to define first product reference indicators, such as by selecting values for the product reference indicator fields 302-1 through 302-5.

In steps 352 and 353, the user operates the problem tracking process 121 to define the first problem synopsis 306 and the first problem description 307. In addition to steps 351 through 353, the user can select a severity level 303 and can providing a mailing list 304 associated with a problem definition 300 being defined. The mail list 304 can identify particular users who should be made aware of this particular problem definition 300 as well as any work items 320 associated therewith. The severity 303 can be selected from a range of values that can identify the importance or severity of this particular problem definition 300.

Next, in step 354 and in sub-steps 355 through 358, the user operates the problem tracking process 121 to define a first work item 320 identifying a first resolution of the first problem definition 300 within a first product reference (e.g., resolution state Field 323).

Within step 354, in step 355, the user operates the problem tracking process 121 to identify a first resolution of the first problem within a first product reference. The first product reference may be defined by, for example, resolution state fields 323 and 324 which identify a particular product and/or version of the product and a particular build or other product identity (e.g., the identity of software module 160). Accordingly, the first product reference may be any type of developed product, documentation for a developed product, a released version of a developed product such as a first software module or other product reference. The objective of step 355 is to associate a particular product area to the work item being defined within the sub-steps of step 354.

Next, in step 356, the user operates the problem tracking process 121 to associate, to the current work item being defined, a work item type 322 which indicates a resolution area of the product reference to which the work item relates. In the example interface 340 illustrated in FIG. 4, the user can select a value for the work item type 322 to identify the particular type or general nature of the work required to provide the resolution of the particular work item 320. Examples of work item types are code fixes, documentation fixes, circuit fixes, hardware modifications, and other such general indicators of work which must be performed in order to resolve the problem identified by the problem description 300 with respect to the product area 323 referenced by this particular work item 320.

In step 357, the user operates the problem tracking process 121 to associate a resolution state that indicates a schedule of completion of the work item in relation to resolution of the first problem identified by the first problem definition 300. By way of example with reference to FIG. 4, the resolution state may be represented by one or more of the status field 325, the priority field 326 and/or the closed field 329 in relation to a particular work item 320. The resolution state defined in step 357 thus identifies the most up-to-date status of the progress in progressing towards the resolution of the problem to the specific product area identified in step 355 for this particular work item 320.

Finally, in step 358, the user operates the problem tracking process 121 to associate an identity of at least one user related to the respective resolution area of the problem to which the work item relates. In other words, in step 358, one or more users 170 and 172 are assigned to handle resolution of the work item 320. With respect to the example interface 340 in FIG. 4, the fixed by field 327 and verify by field 328 are completed in step 358 in order to identify these respective users.

At this plan processing, the user can save 332 the current work item resolution state information 330 selected during the processing of step 354 through 358 in order to create the first work item 320-1. Processing then proceeds to step 359 in FIG. 6.

Figure 6:
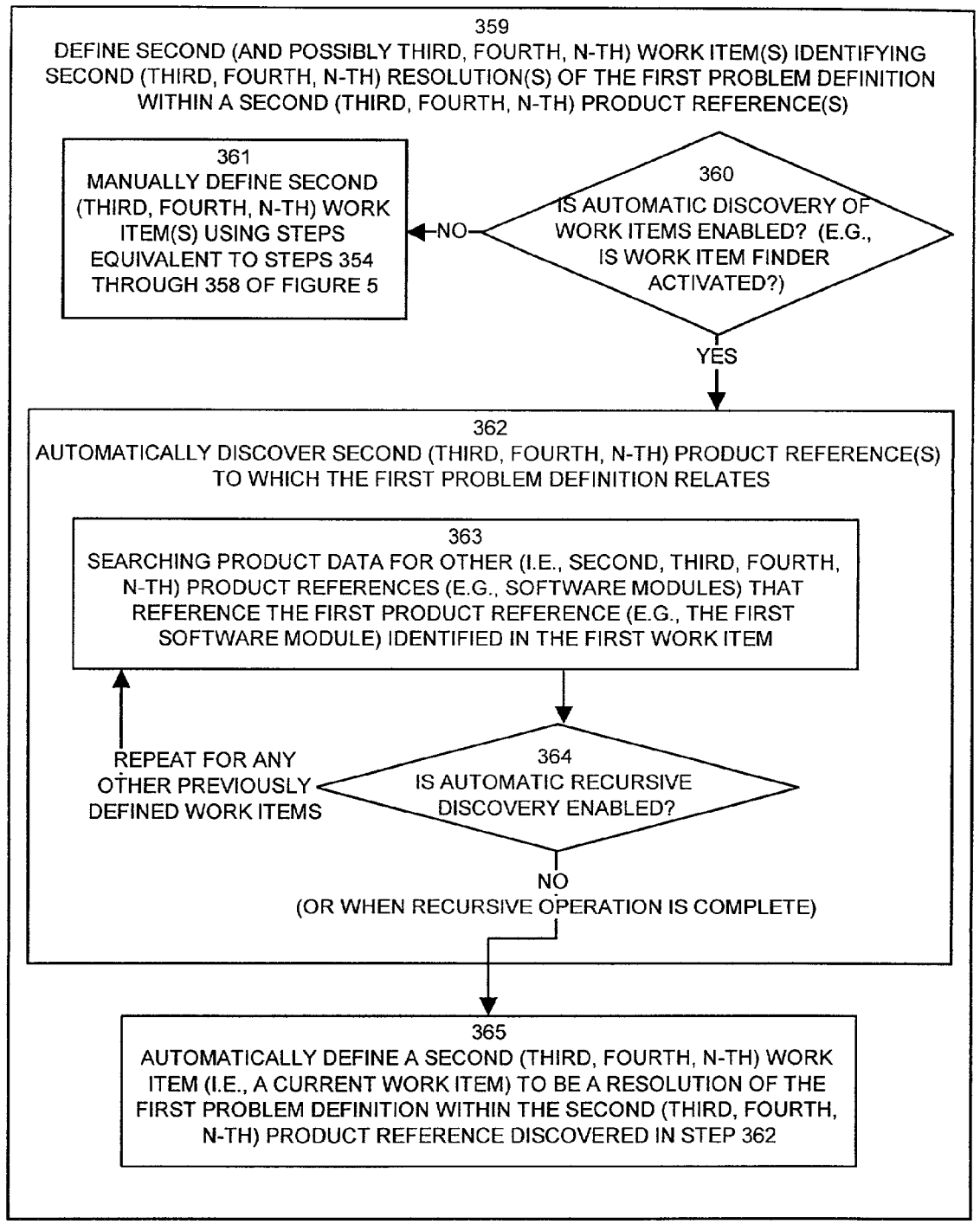

FIG. 6 provides a continuation of the flow chart of processing steps from FIG. 5 and shows the processing performed to define second, third, fourth, fifth and so on work items 320 as may be required to identify a requirement to resolve the problem defined by the problem definition 300 for other product areas.

In step 359, the user operates the problem tracking process 121 to define a second work item 320-2 identifying a second resolution of the first problem definition 300 within a second product area or reference. As indicated in the flow chart of processing steps in FIG. 2, the process of defining other work items 320 can be repeated in order to define a plurality of work items 320 that identify of the resolution required to completely resolve the problem identified by the problem definition 300 within all product area in a particular organization using the problem tracking system provided by embodiments of this invention. To accomplish the definition of other work items, the problem tracking system of this invention performs steps 360 through 365 in FIG. 6.

In particular, in step 360, the problem tracking process 121 determines if automatic discovery of new work items is enabled. With respect to the example architecture of the problem tracking system illustrated in FIG. 3, the problem tracking process 121 in step 360 determines if the work item finder 225 is activated by the user. In other words, the user may turn on or off the work item finder 225 which is responsible for automatically discovering other work items related to currently defined or pre-existing work items 320. In step 360, if automatic discovery of work items is not enabled, processing proceeds to step 361.

In step 361, the user operates the problem tracking process 121 to manually define any other work items 320 using steps equivalent to step 354 through 358 of FIG. 5 as previously explained. In other words, if the user does not desire to have the problem tracking process 121 automatically discover additional work items which may be required to resolve the problem defined by the problem definition 300, the user may manually create such work items using the processing referenced in step 361.

Alternatively, in step 360, if automatic discovery of work items is enabled, processing proceeds to step 362.

In step 362, the user operates the problem tracking process 121 to automatically discover second, third, fourth, fifth and so on (i.e., N-th) product areas or references to which the first problem definition 300 relates. In order to perform the processing of step 362 in this example embodiment, the problem tracking process 121 performs step 363 in 364.

In step 363, the problem tracking process 121 searches the product data database 233 (FIG. 3) in order to discover or find other product references such as other software modules (e.g., other products) that reference the first product reference (such as a first software module 160) which is identified within the first work item 320. By way of an example with respect to software products, the problem tracking process 121 operates the work item finder 225 in the embodiment of the invention in order to search the product data database 233 for any software product source code which makes reference to a software module (e.g., 160 in FIG. 1) that the first work item defines as requiring a resolution to the problem defined by the problem definition 300. In this manner, the work item finder 225 can compile a list of other software products, programs or even other documentation that references to software module 160 containing the problem 162 for which the first work item 320-1 identified that a resolution is required. With respect to the example in FIG. 1, the processing of step 363 might discover products 141 through 152 also reference software module 160 containing the problem 162.

In an alternative embodiment of step 363, other product references can be discovered by referencing the "Found In" information 302-4 and stream information for a particular problem definition 300 to determine what portion of the product (e.g., 302-1) the defect was found in. From this information, other products that reference this same "Found In" information 302-4 can have work items generated since those products also reference the portion of a product to which the problem definition relates.

Next, in step 364, the work item finder 225 within the problem tracking process 121 determines if automatic recursive discovery is enabled. In this example embodiment, it may be the case that many work items 320 have been previously defined. Upon the definition of such work items 320, each work item 320 identifies that the problem defined by the problem definition 300 exists within a specific product area or product reference. As such, if the operation of step 363 discovers that a particular software program (e.g., product 141) references a software product (e.g., module 160) which a work item identified as containing the problem associated with the problem definition 300 (or in the alternative, if the problem definition 300 references, for example, a "Found In" information 302-4), then if the recursive discovery process discovers that some other software product (e.g., product 142) references the software product 141, then product 142 might also contain the error or problem 162 via inheritance of this error from the software product 141. That is, if a first software program inherits a software module 160 that contain a problem 162, and the processing of step 363 discovers another software product which also inherits or references the defective software module 160, the recursive discovery procedure activated in step 364 can look for other software applications which may inherit or use the second software application which inherits the defective software module 160. As a result of this recursive processing, a product which incorporates another product (e.g., a layered product) which could possibly incorporate even another product which eventually, at some level, incorporates a defective software module 160 that contains the problem 162, can be discovered by this embodiment of the invention as a possibly containing issues related to the underlying problem 162 that must be resolved. As a result of this recursive discovery capability, embodiments of the invention can discover any and all software products which may be adversely affected by an underlying problem 162. In this manner, products which "sit on top of" other products can have work items created when a problem is identified with a lower layer or base product.

Accordingly, in step 364, if automatic recursive discovery is enabled, the processing of step 363 is repeated for any other previously defined work items 320 in order to determine if such work items 320 identify software product modules, routines or other such references that may be cross-referenced or inherited by any other software products, routines, modules or the like. Also as noted above, step 363 in an alternative embodiment may also consider references to a product definition's 300 product identification fields 302 to determine what components, streams, or the like the problem relates to and then may discover other products, releases, patches, etc. that reference these streams or components. The repetitive processing of step 363 and 364 is reputed until no product areas can be discovered that reference work items or other previously discovered (i.e., during the recursive process) product areas. In this manner, the processing of step 362 can automatically discover all product references across an entire range of different products which may have some relation to the problem defined by the problem definition 300. The product references produced in step 362 are saved in a list.

In step 364 if automatic recursive discovery is not enabled, or the recursive operation of step 363 is complete, processing proceeds to step 365.

In step 365, the problem tracking process 121 automatically defines any number of work items that are now required to associated a resolution of the first problem definition 300 within the list of respective product references discovered in step 362. In other words, if the processing of step 362 discovered six different product areas or references which could possibly be affected by the problem 162 associated with the problem definition 300, the processing of step 365 causes the problem tracking process 121 to create a respective work item 320 for each of these different product references. Specific details of the processing performed in this example embodiment of the invention to automatically define a work item for a specific product reference are shown with respect to the flow chart of processing steps in FIG. 7.

Figure 7:
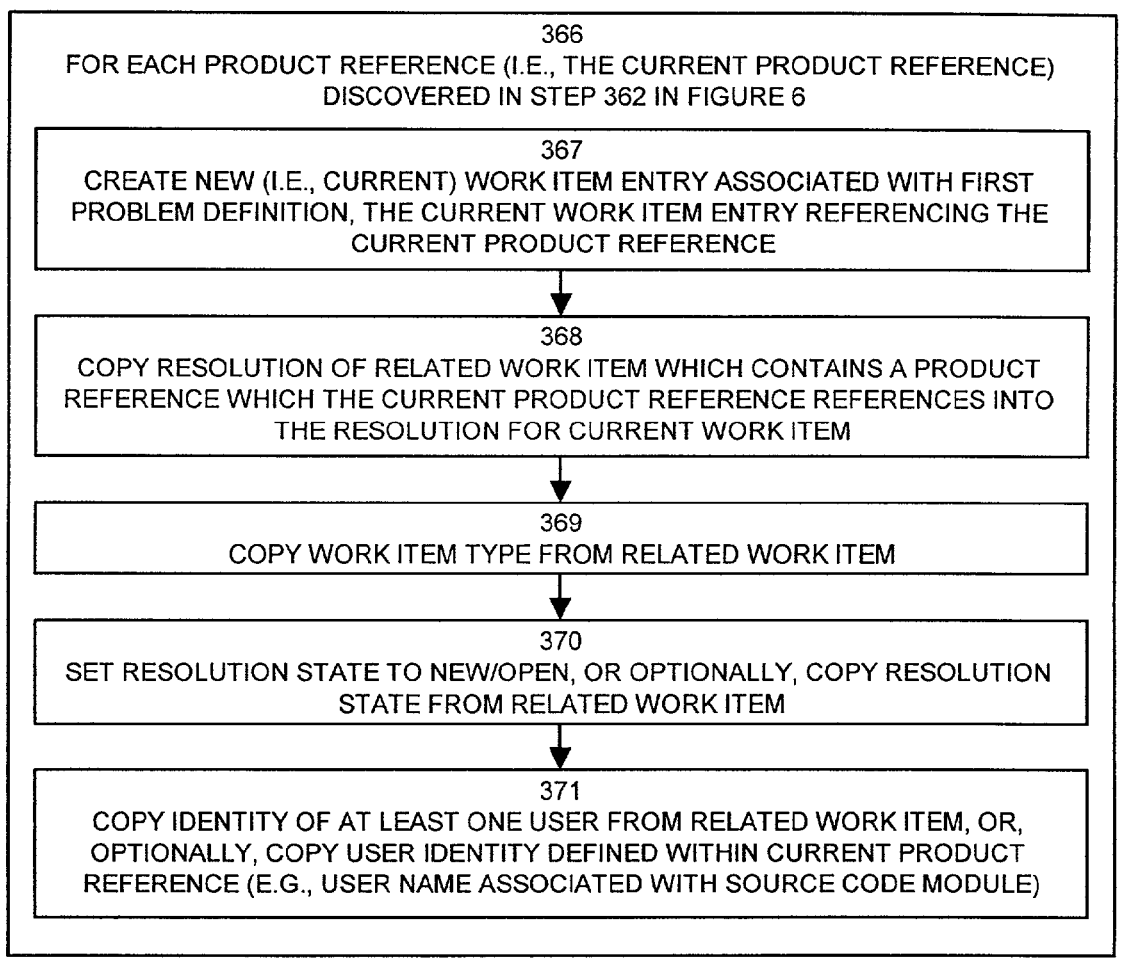

FIG. 7 provides a flow chart of processing steps which show the details of step 365 from FIG. 6.

In particular, in step 366, the processing of steps 367 through 371 is performed for each product reference discovered during the processing of the problem tracking process 121 which occurred within step 362. That is, after the processing of step 362 is performed within the problem tracking process 121 in order to automatically discover other product references to which one or more work items associated with the first problem definition 300 relate, the processing steps 367 through 371 in FIG. 7 are performed by the problem tracking process 121 in order to define work items for each of these product references. For the following discussion of processing steps shown in FIG. 7, the term "related work item" refers to a work item which was discovered to define a resolution to the problem definition 300 for one product area (e.g., a specific reference to a product defined within the product stream and build field 323 and 324) for which another produce reference inherits or references and for which a new work item is being created. In other words, if a first work item references a first resolution to the first problem for a first product area, and another product reference is determined during the automatic discovery process to make reference to the first product reference of this first work item, the first work item is referred to as a related work item and the processing steps illustrated in FIG. 7 are used to create a new or current work item which is based on resolution state information 300 contained within the related work item from which the current work item is derived.

To accomplish this processing, in step 367 the problem tracking process 121 automatically creates a new (i.e., a current) work item entry associated with the first problem definition 300.

Next, in step 368, the problem tracking process 121 sets the current product reference (e.g., the product stream field 323 and build field 324) for the current work item 320 to reference the current product reference that is being processed in this iteration of step 366. In other words, this new work item 320 is set to reference the newly discovered product reference that somehow referenced a product reference within an already existing related work item.

Next, in step 369, the problem tracking process 121 copies the work item type 322 from the related work item 320 (e.g., from the first or formerly existing work item 320-1) for which this current work item (e.g., 320-2) depends into the work item type 322 for the current work item 320. As an example, in step 369, if the current work item is being automatically generated from discovering a related work item that has a work item type 322 that identifies the work item as requiring a code fix (i.e., that requires resolution of the problem within source code of a software application), then since the current work item depends from or relates to the related or former work item, the work item type 322 of the current work item is set to be the same as the work item type of the related work item in step 369. Alternatively, the work item type can be automatically derived based on the type of product identified by the product reference. For example, if the new product reference for which a work item 320 is being created is a documentation file, then the work item type might be set to DOC FIX, instead of CODE FIX.

Next, in step 370, the problem tracking process 121 sets the resolutions state (e.g., the status and closed fields 325 and 329) of the current work item 320 to a new or opened value. In step 370, since the problem tracking process 121 is in the process of creating a new work item, the resolution state of this new work item 320 is an initial or new state since no work has yet been done to resolve the problem 300 in the product area for which this work item relates. In an alternative embodiment, the resolution state of the current work item may be set or copied from the resolution state of the related work item for which this work item is derived. In this manner, since the current work item relates to the related work item in that each of the two work items reference a common piece of software, if the resolution of the first work item which involves fixing the bug within the software module 160 results in also solving the resolution of the same problem with respect to the product reference 323 of the current work item, then the resolution state may be inherited in step 370 thus indicating that even though the current work item is being newly generated for the first time, it may be in a state of resolution which is other than an initial, opened or new state.

Next, in step 371, the problem tracking process 121 copies the identity of at least one user from the related work item to the current work item 320 being created the product reference in this iteration of step 366. In other words, the person responsible for verifying or fixing the related work item as defined in the fixed by or verify fields 327 and 328 can be inherited to this newly created work item for the related product reference being processed in this iteration of step 366. In an alternative embodiment of step 371, the user identity for the current work item may be defined within the current product reference being processed in this iteration of step 366 and that user identity may be used as the user identity within one or both of the fixed by and verify fields 327 and 328. In such an alternative configuration, it may be the case for instance that software source code for the current product reference contains an identity such as a username of the developer user 172 responsible for developing the software referred to by the current product reference. In such cases, the person responsible for resolving the current work item being created in this iteration of step 366 should be the same person who developed the software in the first place.

As a result of this assumption, the processing in step 371 allows the problem tracking process 121 to directly access the product reference to such as, for example, by accessing the product source code within the product data database 233 (FIG. 3) in order to ascertain the identity of the developer of the particular product for which this work item is being created. This user identity is used as the fixed by field 327 for the creation of the current work item in this iteration of step 366. In addition, the problem tracking process 121 may be able to ascertain the identity of a quality assurance person responsible for verifying the proper operation of this particular product identified by the current product reference being processed in this iteration of step 366. If this is possible, the problem tracking process 121 is able to use this identity as a value for the verify by field 328 within the current work item being generated in this iteration of step 366.

In this manner, the processing steps discussed above with respect to FIG. 7 allow the problem tracking system configured according to embodiments of the invention to automatically generate work items 320 based on the existence of cross-references to products for which work items 320 are already defined. In this manner, the problem tracking system configured according to embodiments of the invention saves considerable time and effort in the creation of work items and avoids users having to manually discover and search, for example, other product references that may happen to utilize a particular software module 160 which may be found to contain a problem 162.

Figure 8:
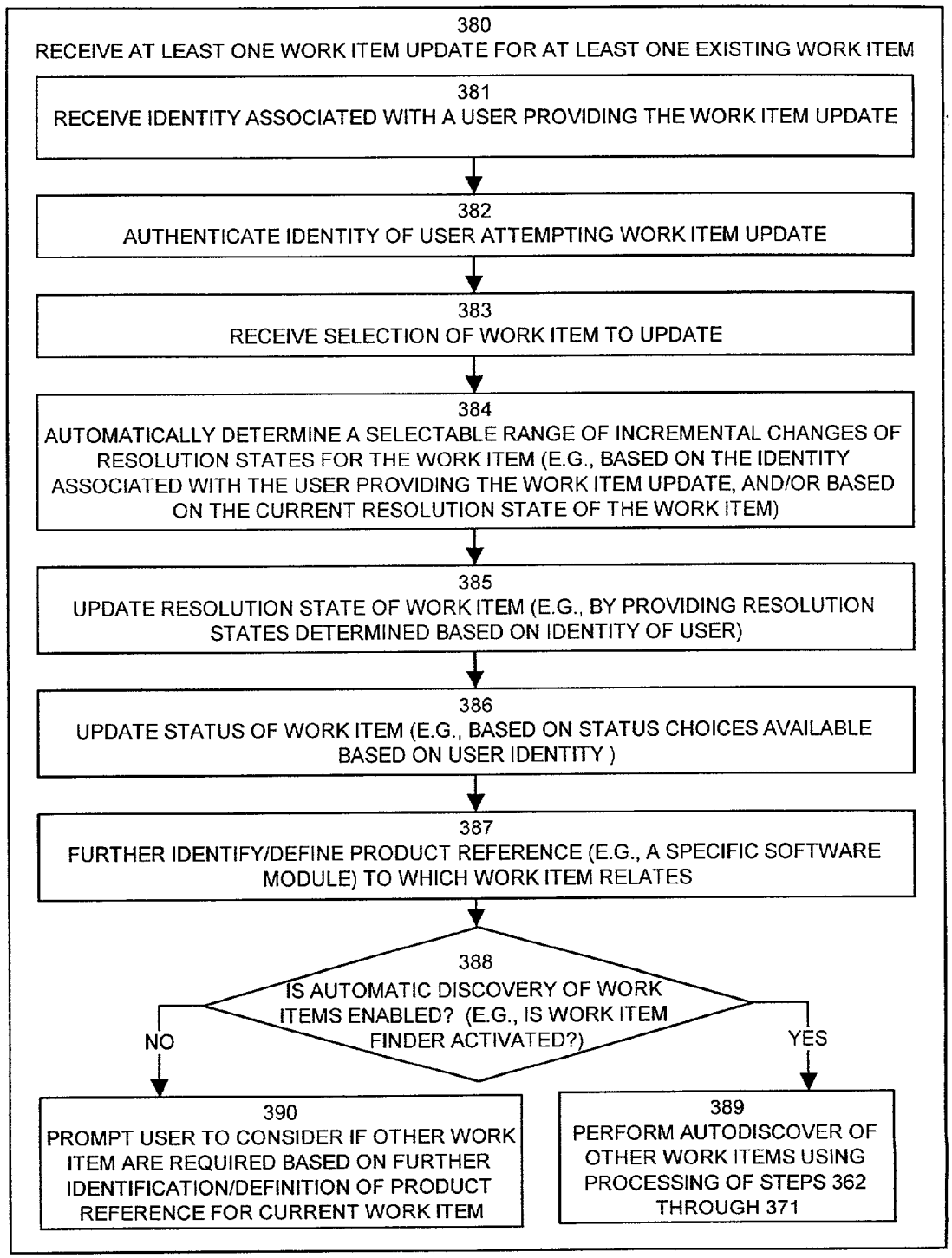
FIG. 8 is a flow chart of processing steps which show the processing performed according to one embodiment of the invention to process work item updates provided by users of the problem tracking system.

FIG. 8 is a flow chart of processing steps configured according to one embodiment of the invention that performs processing of work item updates provided by users to the problem tracking system. The processing steps illustrated in FIG. 8 thus provide a more detailed example embodiment of processing step 203 discussed above with respect to FIG. 2.

In step 380, the problem tracking process 121 receives at least one work item update for at least one existing work item 320. The problem tracking process 121 then performs steps 381 through 390 to handle the work item update in this embodiment of the invention.

In step 381, the problem tracking process 121 receives the identity associated with the user providing the work item update.

Next, in step 382, the problem tracking process 121 authenticates the identity of the user attempting to provide the work item update, for example, by authenticating the user identity in conjunction with the user data database 231 (FIG. 3).

Once authenticated, in step 383, the problem tracking process 121 receives a user selection 321 (FIG. 4) of a particular work item 320 for which to provide a work item update. In making such a selection, the user selects the work item update using the work item selector 321 illustrated in FIG. 4 which causes the resolution state information fields 330 (i.e., the pull-down menus below the list of work items 320) to display the current values associated with the resolution state fields 322 through 329 for the particular selected work item 320.

Next, in step 384, the problem tracking process 121 automatically determines a selectable range of incremental changes to the resolution state information fields 330 for the selected work item 320. In other words, for each pull-down menu representing a resolution state field 322 through 329 within the resolution state information 330 illustrated in FIG. 4, a number of selectable values can be chosen by the user by pulling down the right side arrows next to the current value of each resolution state field 330. In one embodiment, the problem tracking process 121 can, for instance, provide only certain selectable values for each of these resolution state fields 322 through 329 based upon, for example, the identity associated with the user attempting to provide the work item update and/or based on the current resolution state of the work item.

By way of a specific example, if a developer user 172 attempts to provide a work item update on a work item that is closed, it may be the case that the problem tracking process 121 will provide no new selectable values for any of the resolution state fields within the resolution state information area 330 of the display 340 illustrated in FIG. 4. This is because the particular selected work item has already been closed by a quality assurance user 170 and thus a developer should not be modifying information related to that work item 320. In essence, the problem tracking process 121 implements a protection scheme which disallows tampering with a resolution state of particular work items with respect to a particular problem definition 300 by unauthorized users due to limiting the selection of user choices for state fields 300. As another example, a user might only be able to change the status resolution state field 325 from OPEN to TESTING as opposed to being changed back to NEW since the TESTING state comes after the OPEN status state.

In step 385, the problem tracking process 121 allows a user 170 or 172 to update the resolution state of the selected work item 320. Generally, the processing of step 385 allows the user to modify the available selection for each of the pull-down menus within the resolution state information area 330 for the particular selected work item 320.

In step 386, the problem tracking process 121 allows the user to update the status of the work item. This is similar to the processing of step 385 except that this data field 325 and the closed field 329 may be modified at this point in processing. It is understood that the processing of steps 385 and 386 can be combined in one embodiment to allow the user to modify any of the fields 322 through 329 by modifying any of the pull-down menus in any order within the resolution state information area 330 within the interface 340 illustrated in FIG. 4.

Next, in step 387, the problem tracking process 121 allows the user to further identify or define the product reference (e.g., fields 323 and 324 of the FIG. 4) to which the current selected work item 320 is related. In other words, when a work item 320 is first created, it may indicate that a specific product is known but that the stream of the product, such as the version of a particular software product, is unknown at the time of creation of the work item 320. That is, the work item may be created with the knowledge that a particular product is experiencing the problem defined by the problem definition 300 but it may be unclear to the user defining the work item at that time which particular area or precise software module of the product will contain the resolution of the problem defined by the problem definition 300. As such, a work item 320 may be defined in which the stream portion of the product stream field 323 remains incomplete. However, by providing a work item update according to the processing steps illustrated in FIG. 8, in step 387, the user is able to further clarify or define the particular location of the product which requires the resolution of the problem defined by the problem definition 300.

Next, in step 388, in this embodiment of the invention, the problem tracking process 121 determines if automatic discovery of work items is enabled. As discussed above, this processing determines if the work item finder 325 is activated. If automatic discovery of work items is enabled in step 388 and the user operating the problem tracking process 121 desires to discover or attempt to discover additional product references that may be related to the current work item for which the work item update is provided, then processing proceeds to step 389. In other words, after the user has provided a work item update which changes a state or further defines a product reference to which a particular selected work item 320 is related, it may be possible that the user may desire to perform automatic discovery of other work items based on the updated work item information.

As a specific example, if in step 387 the user provided an explicit indication of a software module (e.g., 160) for the product reference which was previously undefined within a selected work item 320, the user may now desire that the software tracking process 121 attempt to discover other product areas which reference the software module which the work item update now provides an indicate for within the current selected work item 320. Prior to receiving the work item update, this information was unknown to the problem tracking system and thus automatic discovery would have been unable to discover other products which make reference to specific software module 160. However, the work item update allows the user to specifically identify this software module 160 and thus automatic discovery may now be appropriate at this time.

In step 389, the problem tracking process 121 performs automatic discovery of other work items as explained previously with respect to the processing of steps 362 through 371 in FIGS. 6 and 7.

Alternatively, in step 388 if automatic discovery of work items is not enabled or the user desires that automatic discovery of work items is not to be performed at this time, processing proceeds to step 390 at which point the problem tracking process 121 prompts the user to consider if other work items are required to be defined based on any further identification with the definition of the product reference for the current work item 320. In other words, if the user provided a work item update which modified the resolution state of a work item 320, in step 390, the problem tracking process 121 warns the user that the update might trigger the ability to discover other product areas which also suffer from the problem 162 defined by the problem definition 300 and it may be prudent at this point to have a user direct the problem tracking process 121 to perform an automatic discovery procedure to ascertain if this is in fact that case.

In addition to aforementioned processing, embodiments of the invention can perform post work item update processing as well. In one alternative embodiment, work items can be automatically created when a work item update indicates, for example, that an open work item is now set to deferred status. As a specific example, if a work item exists for a particular product, and a new release of that product is now under development, a work item update can trigger embodiments of the invention to set the work item for the old release to "deferred status" and can automatically create a new or open work item for the subsequent release of the same product. As another example, a user might set the status of a work item identifying a specific fix to a product as "partial," indicating that the resolution for this work item was only partially fixed. In response to such a work item update, embodiments of the invention can perform work item post processing in order to automatically create or generate another work item for the remainder of the fix in the same product area or in another product area, such as in the next release of a product. In still another example of work item post processing in which embodiments of the invention automatically generate work items in response to receiving a work item update, if a work item indicates a problem as having been resolved, for example, by changing the status from "open" to "fixed," certain embodiments of the invention are able to automatically generate other "verification" work items in order to verify that the problem is resolved in this same product or in another product or products, such as in a layered product that uses the product in which the problem was resolved by the "fixed" work item. In this manner, work item post processing is able to update the status of other work items, or alternatively, can create other work items, based on work item updates.

In another embodiment, work item update post processing can include notifying (e.g., via email) users associated with (e.g., assigned to fix) a work item when the status of the work item is changed. As an example, if a quality assurance person creates a new work item and assigns or associates a software engineer to fix the issue for that work item, once the status changes from new to open, indicating that that work item has been approved for fixing, then embodiments of the invention can email the "fix by" user that they can now begin to work on the issue related to the work item.

In addition, a work item update may trigger embodiments of the invention to handle certain work items en masse. As an example, one possible status of work items might be "open" which indicates that this work item is to be resolved for a release of a product (i.e., a product reference) to which this work item relates. However, if the product is scheduled for a new release, embodiments of the invention can receive a work item update that indicates that all work items that are "open" for the release of a first product should be set to "deferred" and that new "open" work items should be created all together or in bulk for the second release of the product. In this manner, at the end of a software release, for example, all outstanding work items for the first release can be marked deferred and new work item for each outstanding work item can be created for the next release of the product so that users do not spend time resolving work items for product releases that are no longer being shipped or sold.

As discussed above, the processing steps illustrated in FIGS. 6 through 8 illustrate the processing of one example embodiment of the invention in order to define a problem definition 300 and multiple work items 320 which indicate resolutions required to the problem defined by the problem definition 300 within multiple product references or areas. In addition, the aforementioned processing illustrates embodiments of the invention which are able to allow users to provide work item updates which allow the problem tracking system of embodiments of the invention to track a progressing state of the resolution of work items with respect to a particular problem definition 300.

Another function provided by embodiments of the invention is the ability to generate product resolution reports which indicate a summarization in either a simple or detailed format of the progress of resolving one or more problem definitions with respect to work items associated with those problem definitions. In particular, the following discussion explains how one embodiment of the invention is capable of receiving problem definition and work item query criteria and is then able to query the product tracking data databases 130 (and possibly other databases 130) in order to produce product resolution reports that indicate the current status of work items 320 with respect to one or more specific problem definitions 300.

Figure 9:
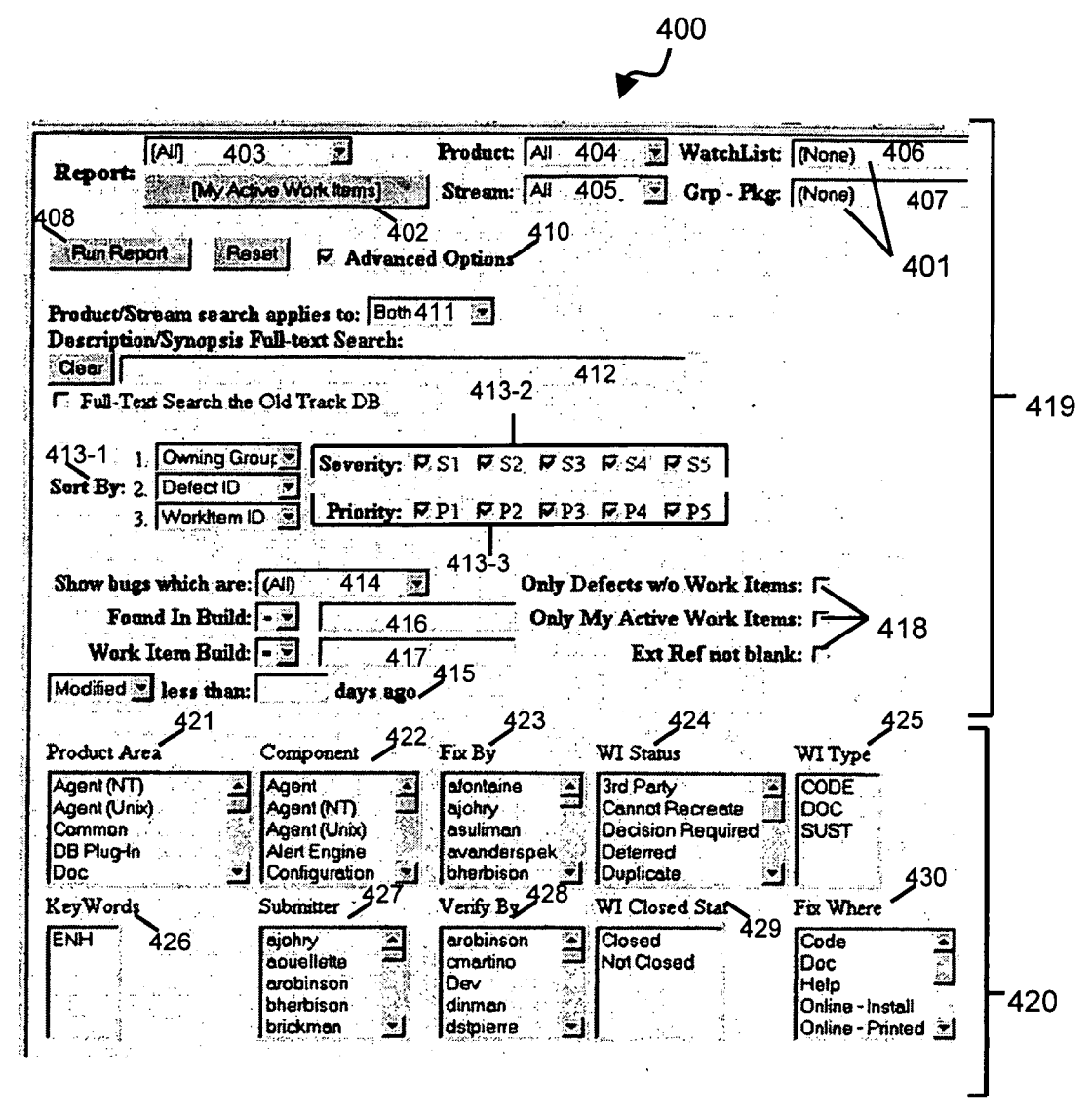

FIG. 9 illustrates an example product resolution query screen 400 (i.e., a graphical user interface screenshot) provided according to one embodiment of the invention to allow users 170 and 172 to query the problem definition database 234 to ascertain the current state of progress in resolving work items with respect to problem definition 300 defined within the problem definition database 234.

In particular, the product resolution query screen 400 in this example includes an area to provide problem definition query criteria 419. The problem definition query criteria area 419 generally allows the user to specify a range of one or more products or portions of product areas or product references based upon various query criteria for the problem tracking process (i.e., the report generator 228 in FIG. 3) gathers problem definition information 300 in order to generate a product resolution report identifying the status of work items 320 related to the problem definition 300. In other words, the problem definition query criteria 319 provides a mechanism to allow users to focus in on certain problem definitions 300 of interest to that user. In addition, the product resolution query screen 400 contains the ability for users to provide work item query criteria 420 from a series of selectable menus 421 through 430 which allows the user to selectively query the status of particular work items 320 that match the work item query criteria 420.

The problem definition query criteria 419 includes problem a report section 401 that allows the user to specify a specific type of parameter report 403. The parameter report field 403 thus enables a user to recall a specific query that might have been formerly performed. As an example, if a user sets certain query parameters within the query criteria 419 and runs these to generate a report, these parameter setting can be saved as a report name. Then, the user is able to return to the interface 400 shown in FIG. 9 and is able to pull-down the menu for the parameter report 403 in order to recall the saved parameter settings to avoid having to set the parameters again. In this example, the user has selected to view "all" parameter report based on the query criteria that the user submits and thus is a type of parameter report that casts the widest query net. A user can start with the "all" report 403 and can then adjust parameters within the interface 400 in FIG. 9 as needed. The active work items selector 402 allows the user to select only that user's active work items for which to generate a product resolution report. In the alternative, or in combination with the foregoing query criteria, the user may further specify a product 404, a stream 405, a watch list 406, and/or a group or package 407 with which to query the problem definition data 234 (FIG. 3) per information. The user may view advanced options 410 which include the ability to specify, using the applies to field 411, how the selected product and stream 404, 405 are used to filter query criteria. As an example, the query criteria can be applied to both products and streams (i.e., subparts of a product such as a software module which is part of a larger software product) in which the work items are "found in" or wherein the work item is assigned or both. As an example, a user can specify that they are interested in querying only for information on problem definitions found in product 1, stream A, or, for all work items associated with product 1 stream A, or, for all problem definitions and work items for product 1 stream A. In addition, the user may provide a full text search 412 within the problem definition query criteria 419 in order to search the description fields 307 or synopsis fields 306 (FIG. 4) of particular product definitions 300 for keywords that match the problem definition query criteria 419.

In addition, the user may specify a sort order 413-1 which indicates how problem definitions 300 are to be sorted for presentation within a product resolution report. The user may also specify severity 413-2 and priority 413-3 query criteria to view problem definition and work item information having certain severity and priority levels. The user may further specify defect or problem specific query criteria at locations 415 and 418 within the product resolution query screen 400. In particular, specific bugs may be selected at location 414 for certain Found-In and Work-Item builds at locations 416 and 417. In this manner, the user may define specific product characteristics to allow the user to ascertain the status of problems, defects or bugs within certain software builds.

In addition to the user being able to define his or her chosen problem definition query criteria 419, the user can also specify specific query criteria 420 via a selection of choices from a variety of menus 421 through 430. Specifically, the user may select from a specific product area 421, component 422, a fixed by identity 423, a work item status 424, a work item type 425, certain keywords 426 associated with work items, certain submitter identities 427, certain verified by identities 428, work item closed status 429, and fixed-by information 430. Each of these menus 421 through 430 are operable by the user within the problem tracking process 121 to allow the user to specify very precise or very general specific query criteria 420 in order to generate a product resolution report. Note that fields 421, 422, 426 and 427 apply to queries searching for fields within problem definitions 300, while fields 423, 424, 425, 428, 429 and 430 apply to queries that search for fields associated with work items 320.

Figure 10:
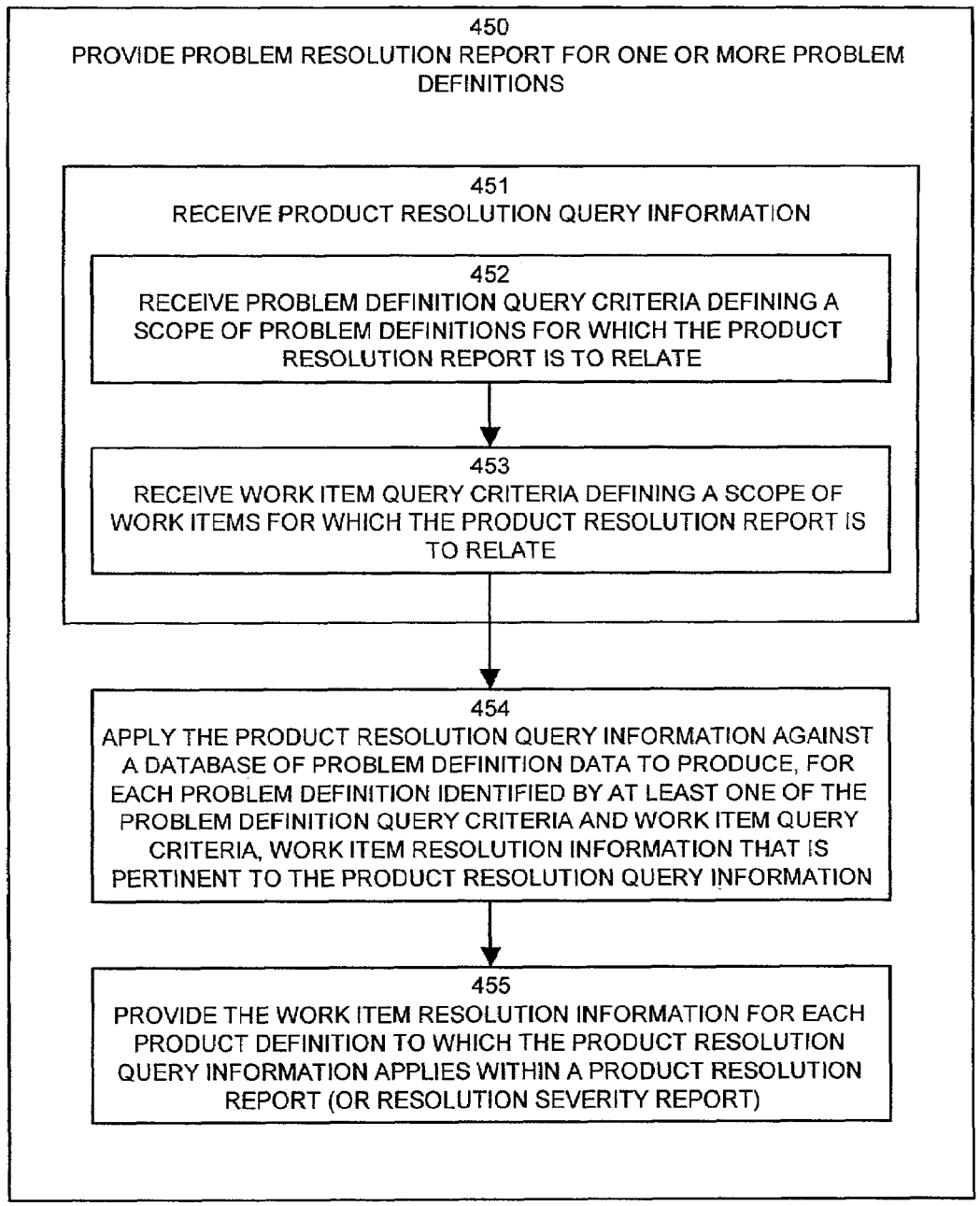
FIG. 10 is a flow chart of processing steps performed according to one embodiment of the invention to provide a problem resolution report for one or more problem definitions according to query criteria provided using the graphical user interface illustrated in FIG. 9.

FIG. 10 is a flow chart of processing steps performed according to one example embodiment of the invention to provide a problem solution report, for example, via the use of the product resolution query screen 400 as illustrated in FIG. 9.

Figure 12:
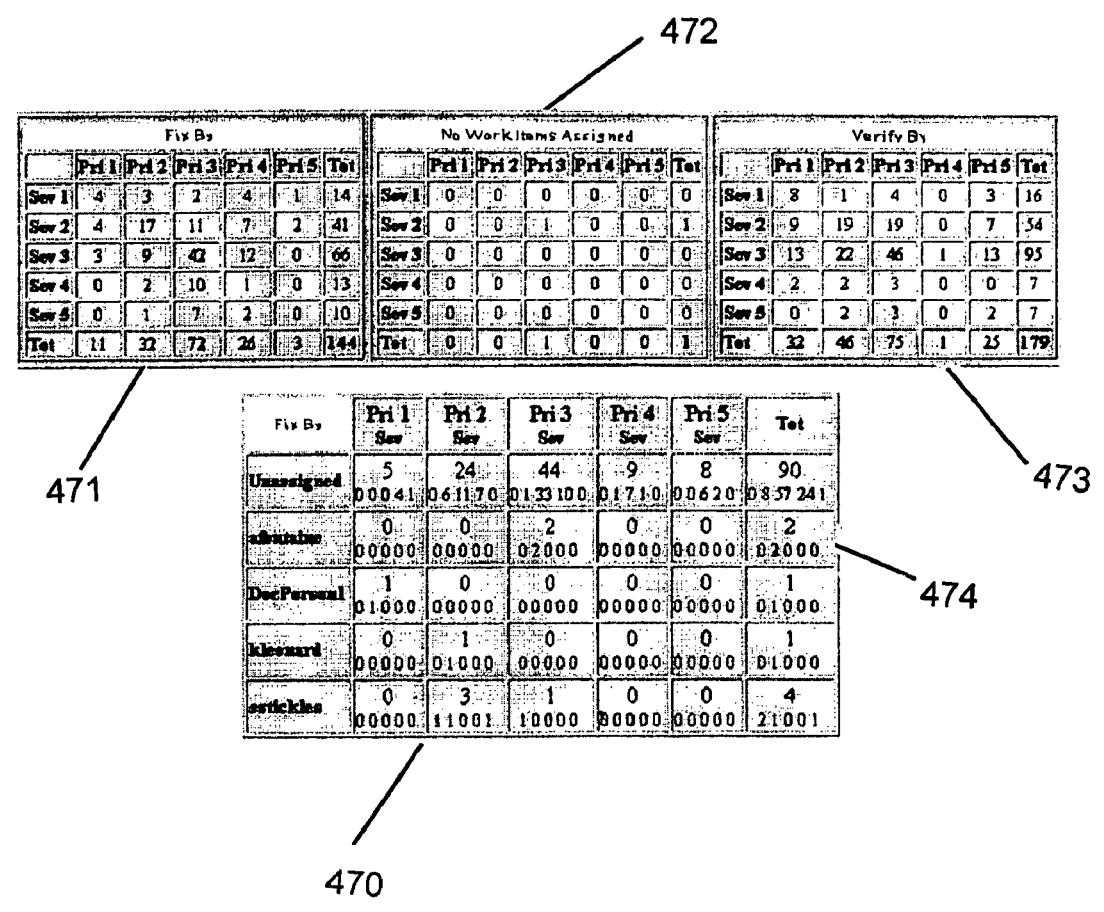

In step 450, the problem tracking process 121 provides a problem resolution report for one or more problem definitions 300. Example problem resolution reports 460 and 470 are illustrated in FIGS. 11 and 12. Those problem resolution reports 460 in 470 will be discussed in the detail in conjunction with the flow chart of processing steps illustrated in FIG. 10.

To provide a problem resolution report 460 or 470, the problem tracking process performs step 451 to receive product resolution query information using the product resolution query screen 400 as previously discussed with respect to FIG. 9.

Specifically, in step 452, the problem tracking process 121 receives problem definition query criteria 419 defining the scope of problem definition 304 which the product resolution report is to relate.

Next, in step 453, the problem tracking process 121 receives work item query criteria 420 defining a scope of work items 320 for which the product resolution report is also to relate. After processing step 453, the problem tracking process 121 has allowed the user to fill out and submit the product resolution query screen 400 illustrated, for example, in FIG. 9. The user may submit such query information by selecting the run report indicator 408 within the query screen 400 shown in FIG. 9. Upon doing so, processing proceeds step 454 in FIG. 10.

In step 454, the problem tracking process 121 applies the product resolution query information against a database of problem definition data 234 (FIG. 3) (or against other databases 130) to produce, for each problem definition 300 identified by at least one of the problem definition query criteria 419 and/or the work item query criteria 420, work item resolution information 461 (FIG. 11) that is pertinent to the product resolution query information (the combination of 419 and 420 from FIG. 9). In other words, in step 454, the problem tracking process 121 accepts the user's input of the query criteria 419 and 420 and queries the problem definition database 234 to obtain the current requested information specifies by the query information with respect to problem definition(s) 300 and with respect to particular work items 320 related to those problem definitions.

Next, in step 455, the problem tracking process 121 provides work item resolution information 461 for each product definition 300 (shown by the product definition description 306 in FIG. 11) to which the product resolution query information 419, 420 applies within a product resolution report 460 (FIG. 11) or 470 (FIG. 12). In this manner, embodiments of the invention allow users to query the problem definition database 234 to gain the status of the resolution of work items 320 with respect to the problem definition 300 to which those work items 320 relate.

FIG. 11 illustrates an example problem resolution report 460. The problem resolution report 460 includes a plurality of defect identities 301-1 through 301-3 that represent the unique identifiers assigned to each problem definition 300. Referring back to FIG. 4, recall that upon entry of a specific problem definition 300, a unique defect identifier 301 is assigned to the problem definition 300. The problem resolution report 460 contains an identity of the product and stream 464 for each defect identifier 301 that allows the user to quickly ascertain to which product the work item resolution information 461 pertains. Also, for each product definition 300 corresponding to the defect identifier 301, the product definition synopsis 306 is displayed to provide an abbreviated indication of the nature of the problem definition to which the defect identifier 301 relates.

In addition, for each problem definition identified by a specific defect identifier 301 within the problem resolution report 460, work item resolution information 461 is displayed for each work item 320 that matches the work item query criteria 420 supplied by the user in the product resolution query screen 400 illustrated in FIG. 9. In other words, the problem tracking process 121 includes information concerning any work items 320 within the problem definition data 234 that match the work item query criteria 420 from FIG. 9. In the instant example in FIG. 11, the status of various work items can be readily and quickly ascertained with respect to each problem definition identified by the defect identifier 301. With respect to the work item resolution information 461 for any particular defect identifier 301, a user can expand any work items 320 that include notes 335 (FIG. 4) by selecting to view the history of a particular work item by selecting the expansion feature 465 to show the work item history. A user can select the expansion feature 465 again to hide the history. In addition to being able to show or hide the history for an individual work item, the user is able to select the "D" (for defect) expansion feature 468 for a particular problem definition (as identified by the defect number 301) and in response, the problem tracking process 121 can collapse or expand the entire problem definition synopsis 306 and all work items 461 into one line so that the user can view the interface 460 synopsis by synopsis. By selecting the "WI" expansion feature 469, the user is able to expand or collapse the set of work items for a particular problem definition 301.

As thus illustrated in the problem resolution report 460 within FIG. 11, the problem tracking process 121 of embodiments of the invention is capable of reporting the progress of the resolution of a common problem that spans many different products by using work items related to a specific problem definition. In this manner, embodiments of the invention provide a concise mechanism for users to quickly understand the status of all outstanding issues related to a problem that may be present in many different product areas. In addition, the problem resolution report 460 provides an accurate representation of what work items remain to be completed in order to resolve the problem in different product areas. Such information is quite difficult to obtain using conventional problem tracking systems since such conventional systems require that users must manually create separate defect entries for the same problem or defect in different product areas. Such conventional systems do not provide a convenient way to accurately report the progress of resolving the same problem in different product areas in the manner such as the example illustrated in FIG. 11.

FIG. 12 illustrates another example of a product resolution report referred to in this example as a resolution severity report 470. The resolution severity report 470 illustrated in FIG. 12 shows different correlation tables 471 through 474 between different query criteria provided with respect to the product resolution query screen 400 illustrated in FIG. 9. In this example, the resolution severity report 470 includes a fixed by correlations table 471, a work item assigned correlations table 472, a verified by correlations table 473 and a fixed by priority table 474. Each table provide the correlations of outstanding work items with respect to two or more selected query parameters.

As a specific example, the fixed by correlations table 471 provides a tabular indication of the number of outstanding work items for each severity level in relation to each different priority level. This information may be obtained when the problem tracking process 121 correlates the priority resolution status field 326 (FIG. 4) for each work item with respect to the severity field 303 with respect to problem definition 300 (also as shown in FIG. 4).

As another example of the ability of embodiments of the invention to cross correlate resolution status fields associated with particular work items 320 in relation to query information related to problem definition 300, the fixed by priority correlations table 474 indicates the number of work items outstanding for particular user identity based on priority and severity levels and further provides a total for each user. In this manner, the problem tracking process 121 configured according to this embodiment of the invention can provide each particular user with an immediate indication of how many outstanding work items that user has scheduled to resolve based on different priority and severity levels. This allows the user to accurately determine his workload at that time and further allows the user to prioritize which work items should be resolved before other work items based on the priority and severity levels of the outstanding work items for that user.

It is to be understood that the problem resolution report 460 in FIG. 11 and the resolution severity report shown in FIG. 12 are provided by way of examples only. Embodiments of invention are capable of producing many types of reports based on any combination of query criteria such as the query fields available for selection within the example product resolution query screen 400 illustrated in FIG. 9. To this end, it is to be understood that embodiments of the invention can provide any type of query of any information related to work items 320 in relation to problem definition 300 and based on any data with the database 130.

Those skilled in the art will understand that there can be many variations made to the embodiments explained above while still achieving the same objective of those embodiments and the invention in general.

In one such alternative, as noted above with respect to step 363 in FIG. 6, automatic generation of work items can be based not only on existing work item information, but also, or alternatively on product information identified in the problem definition 300. As an example automatic generation of work items can be based on the found-in or stream information 302-4 associated with a problem definition. Other alternative embodiments can generate work items based on the handling of existing work items. As an example, if a work item exists for one product and it is not resolved (i.e., it is deferred) until a subsequent release or patch for that product is released, then this embodiment of the invention can automatically create another work item for that same problem or issue within the next release of the product. To state the operation of this alternative embodiment generally, if a customer finds a problem in product 1, version 1, using the techniques explained above with respect to FIGS. 5 through 7, embodiments of the invention can automatically generate work items for product 1 version 1, product 1, version 2, and product A, which may be a layered product on top of product 1. As another example, if a user associates a work item to a particular module of a product, and that module belongs to a stream of a product, then other streams of other products which also reference that module can have work items automatically generated by embodiments of the invention.

Such variations are intended to be within the scope of embodiments of this invention. As such, the foregoing description of embodiments of the invention are not intended to be limiting. Rather, any limitations to the invention are presented in the following claims.

What is claimed is:

1. A method for tracking resolution of a problem using a problem tracking system, the method comprising the steps of:
   receiving a first problem definition by defining a first problem associated with a first product reference;
   defining a first work item identifying a respective first resolution associated with the first problem definition;
   defining a second work item identifying a respective second resolution associated with the first problem definition by:
      automatically discovering a second product reference to which the first problem definition relates; and
      automatically defining the second work item to be a resolution of the first problem definition within the second product reference;
   receiving at least one work item update for at least one of the first and second work items, the at least one work item update altering a resolution state associated with the at least one of the first and second work items for which the work item update is received; and
   providing a problem resolution report for the first problem definition based upon a correlation of resolution states associated with at least the first and second work items.

2. The method of claim 1 wherein:
   the step of receiving a first problem definition comprises a step of defining a first problem within a first product reference;
   the step of defining a first work item comprises the step of identifying a first resolution of the first problem within the first product reference; and
   the step of defining a second work item comprises the step of identifying a second resolution of the first problem within a second product reference; and
   the step of providing a product resolution report comprises the step of:
      retrieving a resolution state of the first work item;
      retrieving a resolution state of the second work item; and
      producing the problem resolution report indicating the resolution state of the first work item for the first product reference as compared to the resolution state of the second work item for the second product reference.

3. The method of claim 2 wherein the first product reference is associated with a first discipline and wherein the second product reference is associated with a second discipline.

4. The method of claim 2 wherein the first product reference is a first release of a product and wherein the second product reference is a second release of the product.

5. The method of claim 2 wherein at least one of the steps of defining first and second work items comprises the steps of:
   associating, to the work item, at least one of:
      i) a work item type indicating an area of the product reference to which the work item relates;
      ii) a resolution state indicating a status of completion of the work item in relation to resolution of the first problem; and
      iii) an identity of at least one user related to the respective resolution of the problem to which the work item relates.

6. The method of claim 1 wherein:
   the first product reference is a first software module;
   the second product reference is a second software module; and
   wherein the step of automatically discovering the second product reference to which the first problem definition relates comprises the step of searching other software modules to discover the second software module that references the first software module.

7. The method of claim 6 wherein the step of receiving a work item update for at least one of the first and second work items comprises the step of:
   receiving a first work item update for the first work item, the first work item update identifying the first software module to which the first problem relates; and
   wherein the steps of automatically discovering a second problem source and automatically defining the second work item are automatically performed in response to receiving the first work item update.

8. The method of claim 1 wherein the step of receiving at least one work item update comprises the steps of:
   receiving an identity associated with a user providing the work item update; and
   determining if the user is authorized to provide a work item update for the first problem definition based on the identity associated with the user, and if the user is authorized to provide the work item update, allowing the user to provide the work item update, and if the user is not authorized, not allowing the user to provide the work item update.

9. The method of claim 8 wherein the step of receiving at least one work item update for at least one of the first and second work items is contingent on the step of determining and comprises the step of:
   receiving a selection of a change in the respective resolution state of the at least one of the first and second work item for the first problem definition, the change representing a step in a range of incremental changes of resolution states required to complete the respective resolution associated with the work item for which the work item update is received.

10. The method of claim 9 wherein the step of receiving a selection of a change in the respective resolution state comprises the step of:
    automatically determining a selectable range of incremental changes of resolution states for the work item based on the identity associated with a user providing the work item update and based on the current resolution state of the work item.

11. The method of claim 1 wherein the step of receiving at least one work item update for at least one of the first and second work item comprises the steps of:
    performing work item post processing to automatically generate at least one other work item associated with the first problem definition, the at least one other work item being generated in response to the altered resolution state associated with the at least one of the first and second work items for which the work item update is received.

12. The method of claim 1 wherein the step of receiving at least one work item update for at least one of the first and second work item comprises the steps of:
    automatically updating a history of the resolution state associated with the at least one of the first and second work items for which the work item update is received.

13. The method of claim 1 wherein the step of receiving at least one work item update for at least one of the first and second work item comprises the steps of:

automatically providing a user notification of a change associated with the at least one of the first and second work items for which the work item update is received.

14. The method of claim 1 wherein the step of providing a product resolution report comprises the steps of:

receiving product resolution query information identifying at least one of:

i) problem definition query criteria defining a scope of problem definitions for which the product resolution report is to relate;

ii) work item query criteria defining a scope of work items for which the product resolution report is to relate;

applying the product resolution query information against a database of problem definition information to produce, for each problem definition identified by at least one of the problem definition query criteria and work item query criteria, work item resolution information that is pertinent to the product resolution query information for that problem definition; and providing the work item resolution information for each product definition to which the product resolution query information applies as a product resolution report.

15. A computer system comprising:

an input output interface;

a communications interface;

a display;

a memory;

a processor; and an interconnection mechanism coupling the input output interface, the communications interface, the display, the memory and the processor;

wherein the memory is encoded with a problem tracking application that when performed on the processor, produces a problem tracking process that causes the computer system to provide a problem tracking system that tracks resolution of a problem by performing the processing operations of:

receiving a first problem definition by defining a first problem associated with a first product reference;

defining a first work item identifying a respective first resolution associated with the first problem definition;

defining a second work item identifying a respective second resolution associated with the first problem definition by:

automatically discovering a second product reference to which the first problem definition relates; and automatically defining the second work item to be a resolution of the first problem definition within the second product reference;

receiving at least one work item update for at least one of the first and second work items, the at least one work item update altering a resolution state associated with the at least one of the first and second work items for which the work item update is received; and providing a problem resolution report for the first problem definition based upon a correlation of resolution states associated with at least the first and second work items.

16. The computer system of claim 15 wherein:

when the computer system performs the operation of receiving a first problem definition, the computer system performs the operation of defining a first problem within a first product reference;

when the computer system performs the operation of defining a first work item, the computer system performs the operation of identifying a first resolution of the first problem within the first product reference; and when the computer system performs the operation of defining a second work item, the computer system performs the operation of identifying a second resolution of the first problem within a second product reference; and when the computer system performs the operation of providing a product resolution report, the computer system performs the operations of:

retrieving a resolution state of the first work item;

retrieving a resolution state of the second work item; and producing the problem resolution report indicating the resolution state of the first work item for the first product reference as compared to the resolution state of the second work item for the second product reference.

17. The computer system of claim 16 wherein the first product reference is a developed product and wherein the second product reference is documentation for the developed product.

18. The computer system of claim 16 wherein the first product reference is a first release of a product and wherein the second product reference is a second release of the product.

19. The computer system of claim 16 wherein when the computer system performs at least one of the operations of defining first and second work items, the computer system performs the operations of:

associating, to the work item, at least one of:

i) a work item type indicating an area of the product reference to which the work item relates;

ii) a resolution state indicating a status of completion of the work item in relation to resolution of the first problem; and iii) an identity of at least one user related to the respective resolution of the problem to which the work item relates.

20. The computer system of claim 15 wherein:

the first product reference is a first software module;

the second product reference is a second software module; and wherein when the computer system performs the operation of automatically discovering the second product reference to which the first problem definition relates, the computer system performs the operation of searching other software modules to discover the second software module that references the first software module.

21. The computer system of claim 20 wherein when the computer system performs the operation of receiving a work item update for at least one of the first and second work items, the computer system performs the operation of:

receiving a first work item update for the first work item, the first work item update identifying the first software module to which the first problem relates; and wherein when the computer system performs the operations of automatically discovering a second problem source and automatically defining the second work item, the computer system automatically performs such operations in response to receiving the first work item update.

22. The computer system of claim 21 wherein of the computer system performs the operation of receiving at least one work item update, the computer system performs the operations of:

receiving an identity associated with a user providing the work item update; and determining if the user is authorized to provide a work item update for the first problem definition based on the identity associated with the user, and if the user is authorized to provide the work item update, allowing the user to provide the work item update, and if the user is not authorized, not allowing the user to provide the work item update.

23. The computer system of claim 22 wherein the operation of receiving at least one work item update for at least one of the first and second work items is contingent on the operation of determining and comprises the operation of:
receiving a selection of a change in the respective resolution state of the at least one of the first and second work item for the first problem definition, the change representing a step in a range of incremental changes of resolution states required to complete the respective resolution associated with the work item for which the work item update is received.

24. The computer system of claim 23 wherein when the computer system performs the operation of receiving a selection of a change in the respective resolution state, the computer system performs the operation of:
automatically determining a selectable range of incremental changes of resolution states for the work item based on the identity associated with a user providing the work item update and based on the current resolution state of the work item.

25. The computer system of claim 15 wherein when the computer system performs the operation of receiving at least one work item update for at least one of the first and second work item, the computer system performs the operation of:
performing work item post processing to automatically generate at least one other work item associated with the first problem definition, the at least one other work item being generated in response to the altered resolution state associated with the at least one of the first and second work items for which the work item update is received.

26. The computer system of claim 15 wherein when the computer system performs the operation of receiving at least one work item update for at least one of the first and second work item, the computer system performs the operation of:
automatically updating a history of the resolution state associated with the at least one of the first and second work items for which the work item update is received.

27. The computer system of claim 15 wherein when the computer system performs the operation of providing a product resolution report, the computer system performs the operations of:
receiving product resolution query information identifying at least one of:
i) problem definition query criteria defining a scope of problem definitions for which the product resolution report is to relate;
ii) work item query criteria defining a scope of work items for which the product resolution report is to relate;
applying the product resolution query information against a database of problem definition information to produce, for each problem definition identified by at least one of the problem definition query criteria and work item query criteria, work item resolution information that is pertinent to the product resolution query information for that problem definition; and
providing the work item resolution information for each product definition to which the product resolution query information applies as a product resolution report.

28. A computer system comprising:
an input output interface;
a communications interface;
a display;
a memory;
a processor; and
an interconnection mechanism coupling the input output interface, the communications interface, the display, the memory and the processor;
wherein the memory is encoded with a problem tracking application that when performed on the processor, produces a means, within the computer system, for providing a problem tracking system that tracks resolution of a problem, the means comprising:
means for receiving a first problem definition by defining a first problem associated with a first product reference;
means for defining a first work item identifying a respective first resolution associated with the first problem definition;
means for defining a second work item identifying a respective second resolution associated with the first problem definition by:
automatically discovering a second product reference to which the first problem definition relates; and
automatically defining the second work item to be a resolution of the first problem definition within the second product reference;
means for receiving at least one work item update for at least one of the first and second work item, the at least one work item update altering a resolution state associated with the at least one of the first and second work items for which the work item update is received; and
means for providing a problem resolution report for the first problem definition based upon a correlation of resolution states associated with at least the first and second work items.

29. A computer program product having a computer-readable medium including computer program logic encoded thereon that, when performed on a computer system having a coupling of a memory, a processor, and a display provides a method for providing a problem tracking system that tracks resolution of a problem by causing the computer system to perform the operations of:
receiving a first problem definition by defining a first problem associated with a first product reference;
defining a first work item identifying a respective first resolution associated with the first problem definition;
defining a second work item identifying a respective second resolution associated with the first problem definition by:
automatically discovering a second product reference to which the first problem definition relates; and
automatically defining the second work item to be a resolution of the first problem definition within the second product reference;
receiving at least one work item update for at least one of the first and second work item, the at least one work item update altering a resolution state associated with the at least one of the first and second work items for which the work item update is received; and
providing a problem resolution report for the first problem definition based upon a correlation of resolution states associated with at least the first and second work items.

* * * * *